(12) United States Patent
Vantrease

(10) Patent No.: US 11,752,685 B2
(45) Date of Patent: Sep. 12, 2023

(54) THERMOFORMING APPARATUS WITH FRAME CORNER BEAMS AND PLATEN CLOSING MECHANISM

(71) Applicant: Irwin Research and Development, Inc., Yakima, WA (US)

(72) Inventor: Dale L. Vantrease, Naches, WA (US)

(73) Assignee: Irwin Research and Development, Inc., Yakima, WA (US)

( * ) Notice: Subject to any disclaimer, the term of this patent is extended or adjusted under 35 U.S.C. 154(b) by 0 days.

(21) Appl. No.: 15/957,792

(22) Filed: Apr. 19, 2018

(65) Prior Publication Data
US 2019/0322029 A1    Oct. 24, 2019

(51) Int. Cl.
| | |
|---|---|
| B29C 51/38 | (2006.01) |
| B30B 1/26 | (2006.01) |
| B30B 1/14 | (2006.01) |
| B30B 15/04 | (2006.01) |
| B30B 1/16 | (2006.01) |
| B29C 51/10 | (2006.01) |
| B29C 51/24 | (2006.01) |

(52) U.S. Cl.
CPC ............. B29C 51/24 (2013.01); B29C 51/38 (2013.01); B30B 1/14 (2013.01); B30B 1/268 (2013.01); *B29C 51/10* (2013.01); *B30B 1/16* (2013.01); *B30B 15/041* (2013.01)

(58) Field of Classification Search
CPC ......... B29C 51/24; B29C 51/38; B29C 51/10; B30B 1/14; B30B 1/268; B30B 1/16; B30B 15/041
See application file for complete search history.

(56) References Cited

U.S. PATENT DOCUMENTS

| | | | | |
|---|---|---|---|---|
| 4,878,826 A | * | 11/1989 | Wendt | B29C 51/04 425/149 |
| 5,002,479 A | * | 3/1991 | Brown | B29C 33/20 100/257 |
| 5,385,465 A | | 1/1995 | Greiwe et al. | |
| 6,055,904 A | | 5/2000 | Chun et al. | |

(Continued)

FOREIGN PATENT DOCUMENTS

| | | |
|---|---|---|
| DE | 2900901 | 7/1980 |
| WO | PCT/US2019/028181 | 8/2019 |
| WO | PCT/US2019/029181 | 8/2019 |

*Primary Examiner* — Francisco W Tschen
*Assistant Examiner* — Elisa H Vera
(74) *Attorney, Agent, or Firm* — Keith D. Grzelak; Wells St. John P.S.

(57) ABSTRACT

A thermoforming apparatus is provided having a frame, a pair of opposed platens, a toggle shaft, a kinematic linkage, a form air manifold, and a pair of articulating bearing assemblies. The pair of opposed platens is carried by the frame each with a die, one die configured to engage an opposed face of another die across a heated sheet of thermoformable material in sealed relation there between. The toggle shaft is carried by the frame for rotation. The kinematic linkage is coupled between the toggle shaft and one of the dies. The form air manifold and a source of differential pressure is coupled with a die face on one of the dies. The pair of articulating bearing assemblies is carried by the frame and configured to support the at least one toggle shaft for translation towards and away from the another die and platen. A method is also provided.

19 Claims, 36 Drawing Sheets

FIG. 6

(56) References Cited

U.S. PATENT DOCUMENTS

| | | |
|---|---|---|
| 8,356,990 B2 | 1/2013 | Keeley |
| 8,790,108 B2 | 7/2014 | Lakatos |
| 2003/0090041 A1* | 5/2003 | Nemeskeri .......... B29C 37/0007 |
| | | 264/544 |
| 2004/0250709 A1 | 12/2004 | Schlepp |
| 2013/0049242 A1 | 2/2013 | Vantrease |
| 2013/0119584 A1 | 5/2013 | Irwin |
| 2013/0122130 A1* | 5/2013 | Vantrease ............... B29C 51/46 |
| | | 425/150 |
| 2017/0080629 A1 | 3/2017 | Irwin |
| 2017/0095988 A1* | 4/2017 | Rauschenberger ..... B30B 15/14 |

* cited by examiner

THERMOFORMING APPARATUS WITH FRAME CORNER BEAMS AND PLATEN CLOSING MECHANISM

CROSS REFERENCE TO RELATED APPLICATION

This application does not claim priority from any other application.

TECHNICAL FIELD

The disclosure pertains generally to thermoforming apparatus. More particularly, this disclosure relates to thermoforming machines having a differential load source configured to counteract elastic and/or plastic structural deformation of components for a forming machine while applying differential or pneumatic forming pressure during an article forming operation and to coin article flanges.

BACKGROUND OF THE DISCLOSURE

The use of large tonnage thermoforming frames and drive mechanisms is known where pneumatic pressure is being applied to a heated sheet of thermoformable material during an article forming operation. Where large arrays of articles are provided on die plates on a platen, the surface area subject to pneumatic pressure and/or vacuum generates very large loads on the kinematic drive linkages and frame of a thermoforming machine. Improvements are needed in order to enable forming using very large loads without requiring further increases in the size and strength of traditional frames and linkages of a thermoforming machine while mitigating forming problems resulting from elastic deformation of thermoforming machine components, particularly when forming newer plastic sheet materials and/or article geometries that require greater forming pressures and loads. Furthermore, there is a need to impart precision control on rim formation of thermoformed articles during a forming operation.

Other aspects and implementations are contemplated.

SUMMARY OF THE INVENTION

A thermoforming machine is provided having a differential load source, or force activated platen closing mechanism wherein one or more platens can be adjusted to a specific shut height for varying tool heights and material size, can impart an over-clamp load to coin articles, and provide a differential load to compensate for deflection in a thermoforming machine by further closing the platens together to obviate or significantly mitigate the deflection, deformation and/or elastic and/or plastic deformation in the frame, linkages and/or components of the thermoforming machine.

According to one aspect, a thermoforming machine is provided having a frame, a pair of opposed platens, an article forming differential pressure applicator, and a force actuated translating die mount. The pair of opposed platens is carried by the frame each with a die. One die is configured to engage an opposed face of another die across a heated sheet of thermoformable material in sealed relation there between. The article forming differential pressure applicator is interposed between the frame and one of the dies and is configured to impart differential pressure across the heated web within a sealed region between the dies when the dies are closed together about the sheet to urge the heated sheet into one of the dies or another of the dies. The force actuated translating die mount is provided between the one die and the frame is configured to impart a closing differential displacement to the one die towards the another die proportioned to at least counteract structural separation resulting from structural deformation of at least the frame caused by forming pressure between the one die and the another die during a forming operation.

According to another aspect, a thermoforming apparatus is provided having a frame, a pair of opposed platens, a toggle shaft, a kinematic linkage, a form air manifold, and a pair of articulating bearing assemblies. The pair of opposed platens is carried by the frame each with a die, one die configured to engage an opposed face of another die across a heated sheet of thermoformable material in sealed relation there between. The toggle shaft is carried by the frame for rotation. The kinematic linkage is coupled between the toggle shaft and one of the dies. The form air manifold and a source of differential pressure is coupled with a die face on one of the dies. The pair of articulating bearing assemblies is carried by the frame is configured to support the at least one toggle shaft for translation towards and away from the another die and platen.

According to yet another aspect, a method of thermoforming an article is provided. The method includes: providing a pair of opposed platens carried by a thermoforming frame each with a die, both dies coating and held together about a heated sheet of thermoformable material; generating a pneumatic differential forming load between the frame and one of the dies and configured to draw the heated sheet into a female cavity in the one die of the one platen; and applying a force between the one die and the frame to displace the one die towards the another die to at least in part negate structural deformation of at least the frame from the forming load.

BRIEF DESCRIPTION OF THE DRAWINGS

Exemplary embodiments of the various disclosures are described below with reference to the following accompanying drawings. The drawings may be considered to represent scale.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

Figure 1:
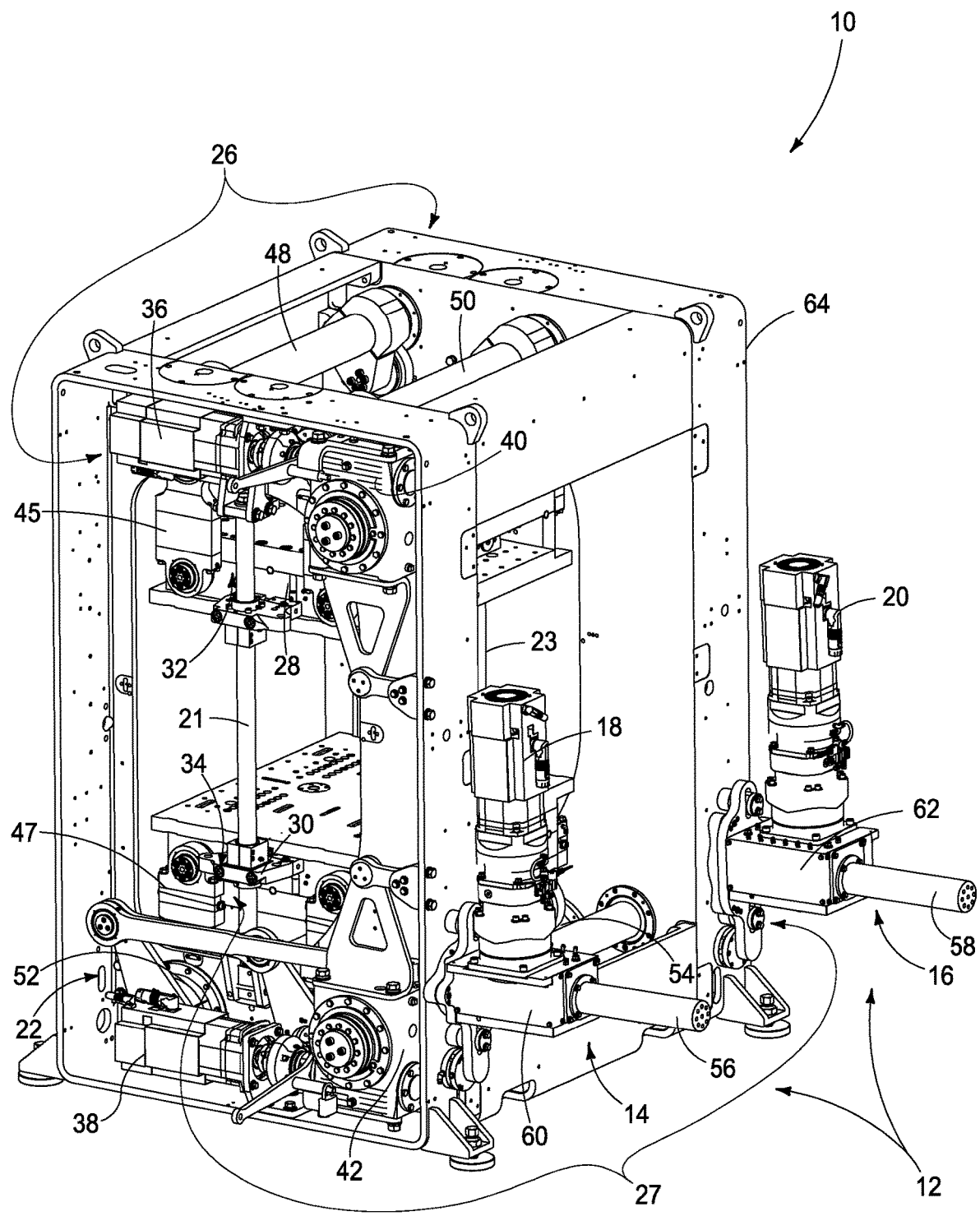
FIG. 1 is a right downstream end perspective view from above of a thermoforming machine having a differential load source with a Servo Actuated Shut Height (SASH)

FIG. 1 illustrates one suitable construction for a thermoforming machine 10 having an upper platen 28 and a lower platen 30. Although not shown, it is understood that conveyor rails pass completely through thermoforming machine 10 for conveying a heated sheet of thermoformable material there through during a forming operation from an upstream end on the left to a downstream end on the right. Thermoforming machine 10 has a new differential load source, or servo actuated shut height (SASH) mechanism 12 that imparts an upward differential load to raise lower platen 30 when platens 28 and 30 are closed together during a forming operation. An upper platen drive assembly 26 cyclically drives upper platen 28 down and up while a lower platen drive assembly 27 drives lower platen 30 up and down in synchronization within a rigid steel frame 64. An upper platen servo motor drive assembly 36 is configured to drive an upper gear box 40 that drives a cross shaft 41 (see FIG. 23) to reciprocate an upper platen drive assembly 32 via reciprocation of platen drive toggle shafts 48 and 50 to raise and lower upper platen 28. Upper platen drive assembly 32 includes a crank arm 137, a drive arm, or link 148, a connecting link, or follower arm 145, and crank arms 150 and 151 (see FIG. 23), and four connecting rods 45 driven up and down via reciprocating (rotating to and fro) toggle shafts 48 and 50. Likewise, a lower platen servo motor drive assembly 38 is configured to drive a lower gear box 42 that drives a cross shaft 43 (see FIG. 23) to reciprocate a lower platen drive assembly 34 which reciprocates platen drive toggle shafts 52 and 54 (see FIG. 2) to raise and lower platen 30. Lower platen drive assembly 34 includes a shaft crank arm 139, a drive arm, or link 149, a connecting link, or follower arm 147, and crank arms 152 and 153 (see FIG. 23), and four connecting rods 47 (see FIG. 1) driven up and down via reciprocating (rotating to and fro) toggle shafts 52 and 54 (see FIG. 3). As shown, toggle shafts 48, 50, 52 and 54 are supported at each end with a rotary bearing assembly (not shown). Likewise, each end of connecting rods 145 and 147 is affixed to a radial arm on a respective toggle shaft 48, 50, 52 and 54 and one of platens 28 and 30 with a rotary bearing assembly (not shown). Furthermore, each end of follower arms 145 and 147 connect to a respective arm 150, 151 and 152, 153 via a respective rotary bearing (not shown). Upper platen drive assembly 32 and lower platen drive assembly 34 each form a kinematic linkage for driving platens 28 and 30 between open and closed positions when carrying forming dies (not shown).

Differential load source, or SASH 12 includes a right drive assembly 14 and a left drive assembly 16 that cooperate to deliver a differential load to lower platen 30 configured to counteract the effects of any load deformation to the frame 64 and components when a pneumatic load source 61 (see FIG. 4) is imparted between one of a pair of forming dies (not shown) and a sheet of thermoformable material during a thermoforming operation. Source 61 can impart, by way of example, in the range of 120 psi pressure across a top surface of a bottom die plate 53 (see FIG. 4) generating large tonnage loads between the dies 28, 30 and platens 51, 53, and across the frame 64. Such load deformation would otherwise lead to a slight separation between engaged dies on opposed die plates (attached to each platen) that would degrade or disable seals provided there between due to deformation of the frame 64 and drive components.

More particularly, differential load source, or SASH 12 has two mirror-image drive assemblies 14 and 16 that enable force tailoring, or adjustment of differential loads generated by each of the left and right sides of platens 28 and 30. Each drive assembly 14 and 16 includes respective drive motor assemblies 18 and 20 configured to drive in reciprocation linear drive units 60 and 62 that reciprocate to and fro to drive respective right and left drive linkages 22 and 24 (see FIG. 2). A pair of drive rack protective covers 56 and 58 provide protection of workers from reciprocating drive components. A pair of die plates 51 and 53 (see FIG. 4) affix to platens 28 and 30, respectively, and a pair of die guide posts 21 and 23 (see FIG. 1) mate with guide bushings not shown) on each die plate 51 and 53.

Additionally, such a differential load source can enable continued operation of a damaged, or plastically deformed steel frame (or components) on a forming machine. Likewise, such a differential load source can enable continued operation of a thermoforming machine with tight closing tolerances when wear of components has created a loose fit between components resulting in a gap between mating die plates.

Figure 22:
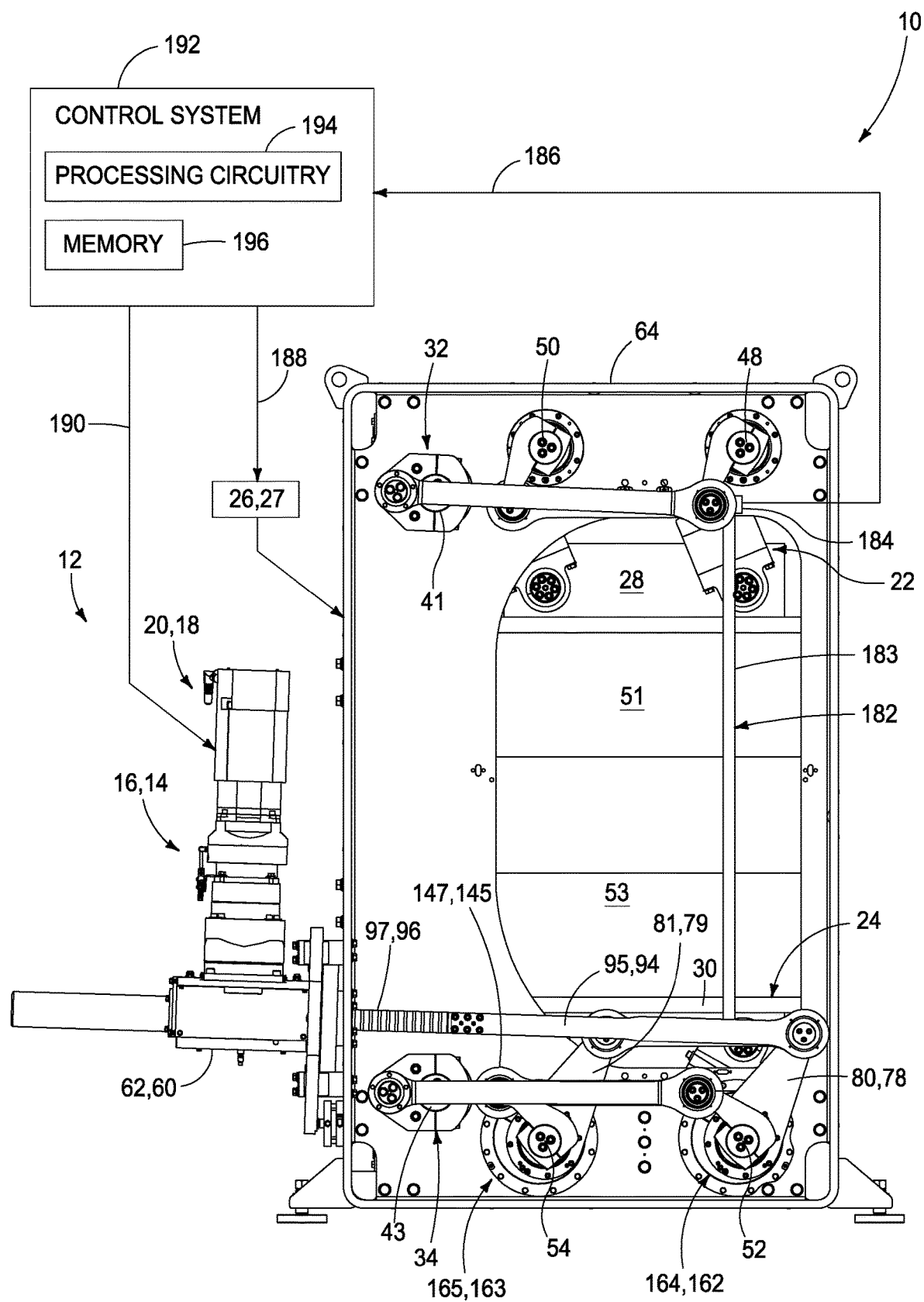
FIG. 22 is a left-side view of the thermoforming machine of FIG. 1 including the platen drive shaft, drive motors and drive linkages showing the platens in a fully open position and SASH in a home position.
Figure 23:
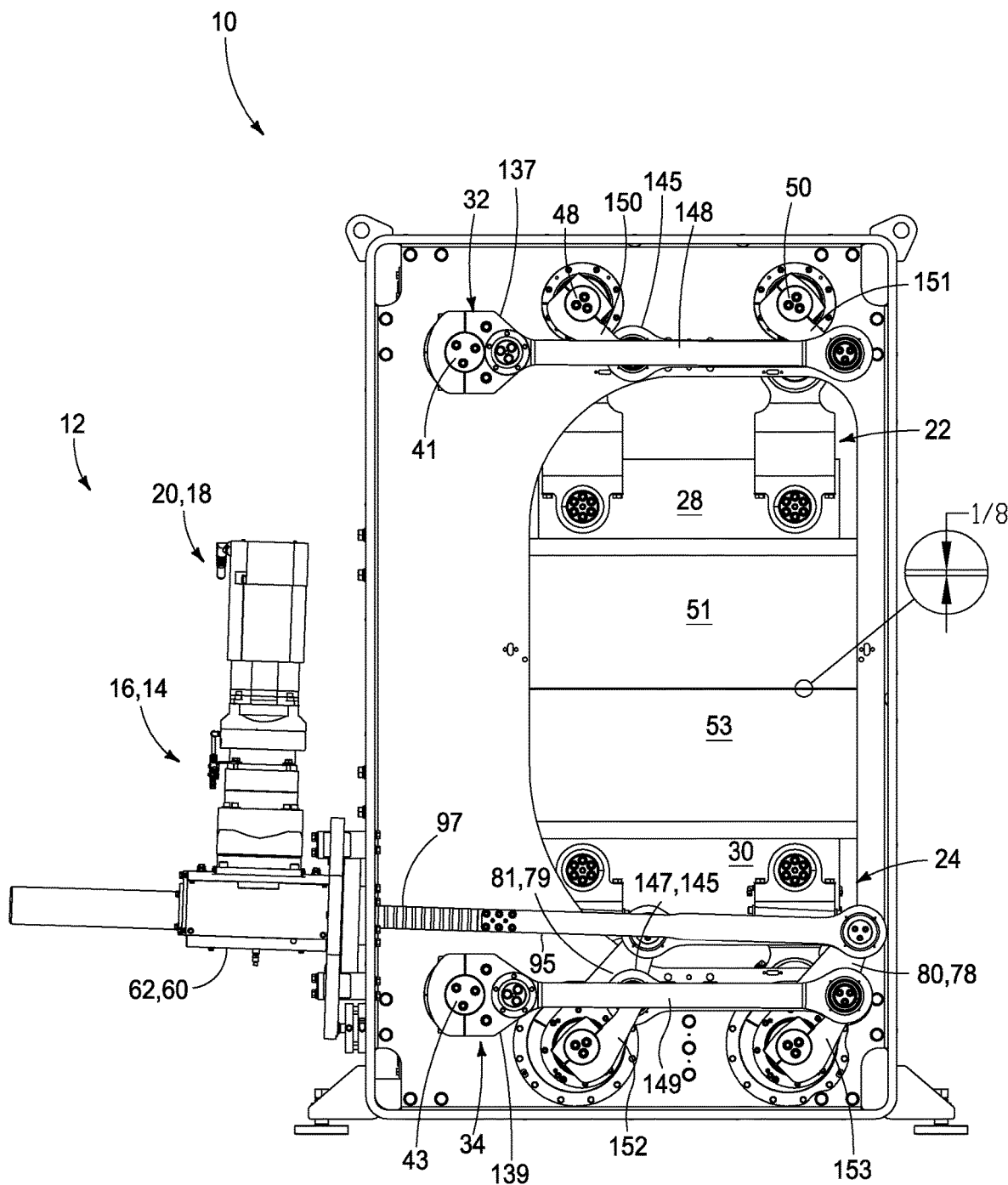
FIG. 23 is a left-side view of the thermoforming machine of FIG. 1 including the platen drive shaft, drive motors and drive linkages showing the platens in a fully closed position and the SASH in a home position.

Respective modern rotary electric servo drive motors 36 and 38 independently drive platen drive assemblies 32 and 34, platens 28 and 30, and die plates 51 and 53 (see FIGS. 22-23). Such motors are driven by a computer control system, as is presently understood in the art. Other kinematic linkages and drive motor arrangements can be used in the alternative. Such a drive includes an AC servo motor and an associated servo drive motor controller. For example, one suitable AC servo drive motor is a SIEMENS SERVO MOTOR W/AS20DQI (1FT7108-5SC71-1BA0) sold by Siemens AG, Automation Group, Automation Systems for Machine Tools, Robots and Special—Purpose Machines, P.O. Box 31 AD, D—91050, Erlangen, Federal Republic of Germany and available in the United States at Siemens Corporation, 300 New Jersey Avenue, Suite 1000, Washington, D.C. 20001 United States. One suitable drive gearbox is a WITTENSTEIN SP+SERIES PLANETARY GEARBOX—20:1 RATIO—W/SIEMENS 1FT7108 ADAPTER (SP240S-MF2-20-1FT7108).

Additionally, one suitable servo drive motor controller is sold by Siemens as a digital feed drive system including an S120 series SINAMICS servo drive controller. Other controllers can also be used. Such a drive will provide a predictable motor device that can very accurately position a machine element to a desired position at a given time. Accordingly, the associated servo motor is a brushless servo motor. Using suitable control software, activation of associated machine components can also be triggered based on velocity or position of a drive, by using a velocity profile or an integrated displacement of the drive.

Figure 2:
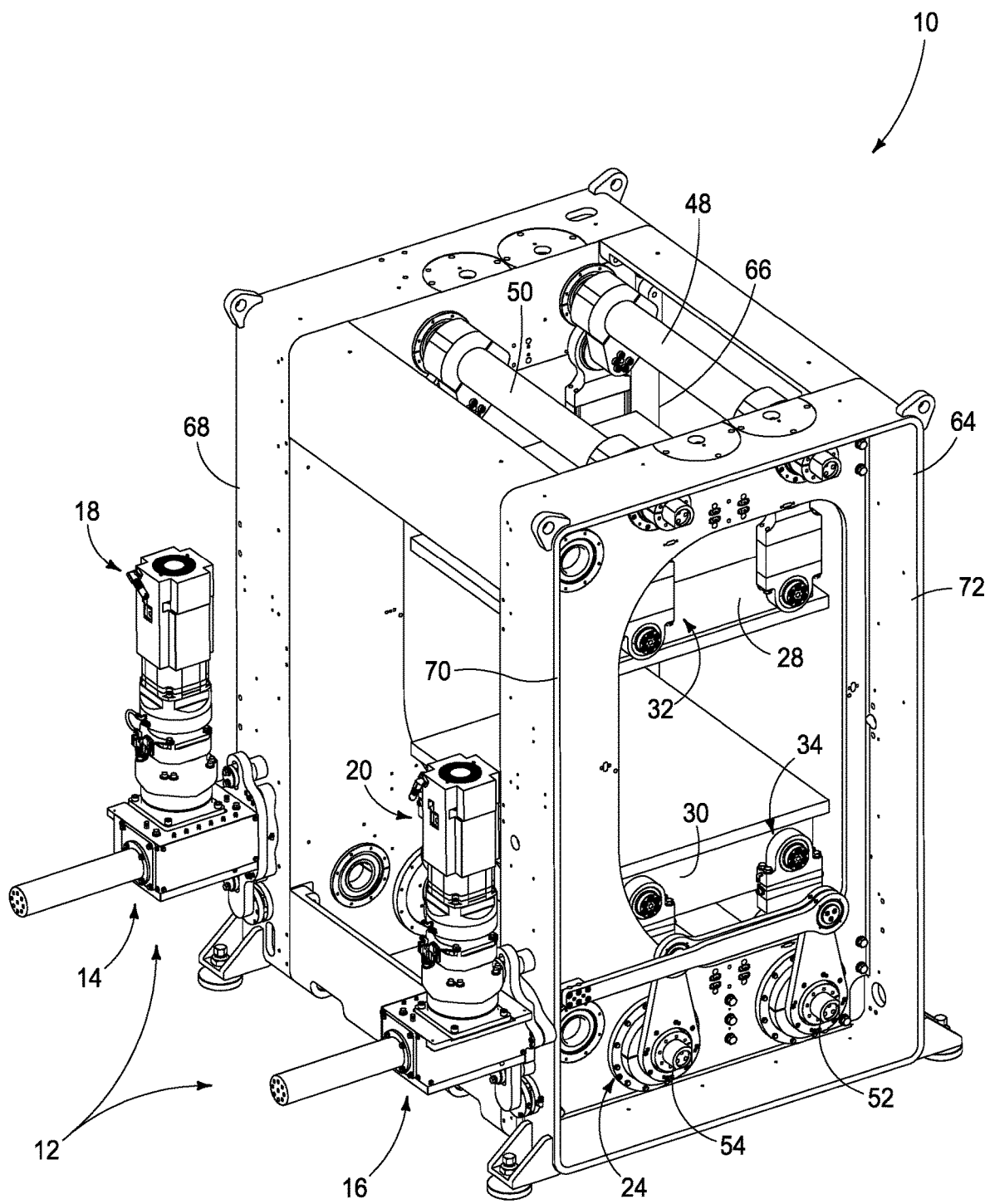
FIG. 2 is a left downstream end perspective view from above of the thermoforming machine of FIG. 1, but with the platen drive shaft, drive motors and drive linkages for reciprocating platen drive assembly removed to facilitate viewing of the differential load source and SASH.
Figure 3:
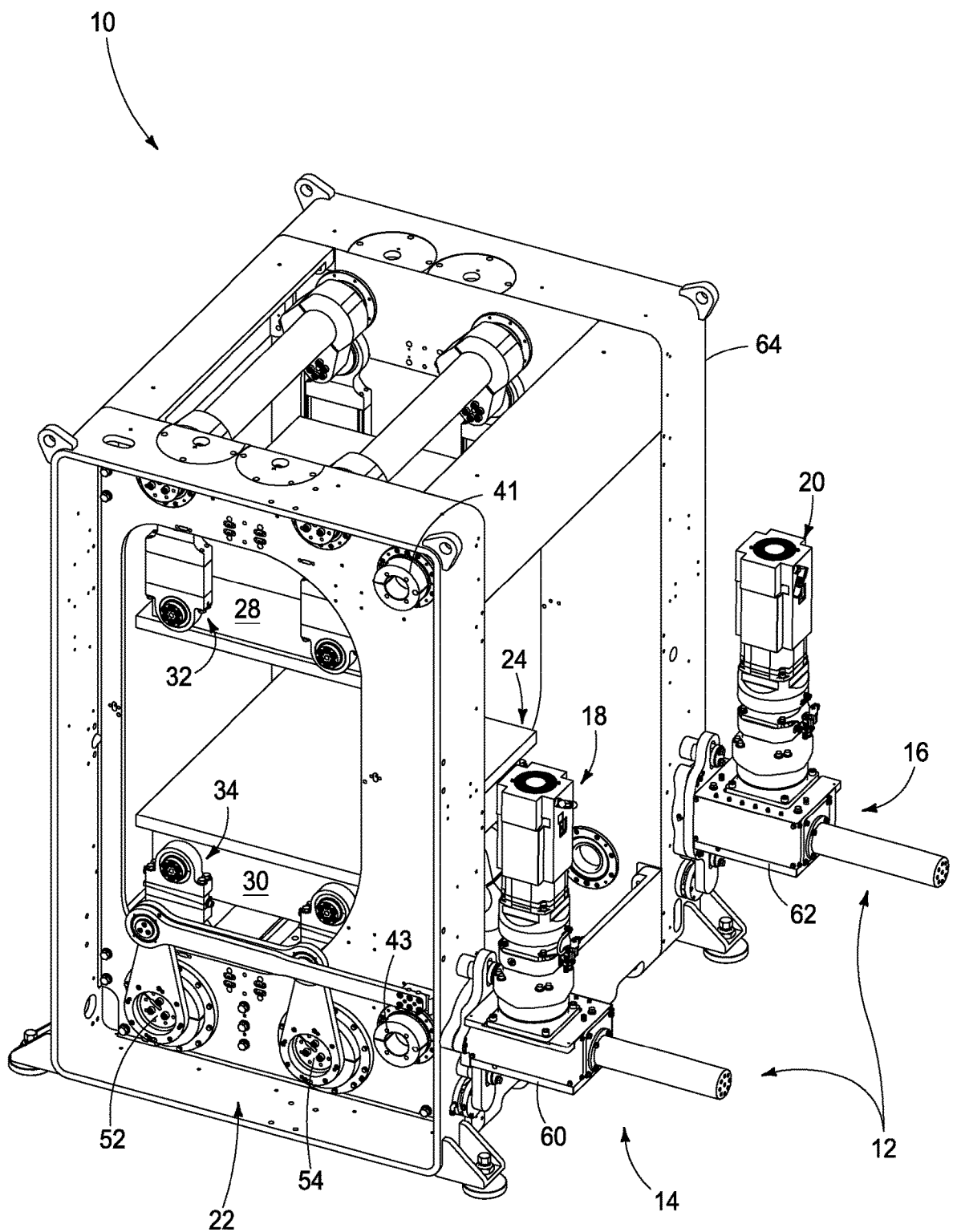
FIG. 3 is a right downstream end perspective view from above of the thermoforming machine of FIG. 2, but with the platen drive shaft, drive motors and drive linkages for the reciprocating platen drive assembly removed to facilitate viewing of the differential load source and SASH.

FIGS. 1-3 illustrate thermoforming machine 10 with platens 28 and 30 in a closed position with platen 28 at a lowest position and platen 30 at a highest position driven together by upper drive mechanism 26 and lower drive mechanism 27 which provide a platen closing mechanism. When closed together with a pair of coacting die plates, or article forming members (see FIG. 4), pressure is applied via pressure source 61 (see FIG. 4) that generates large tonnage loads between platens 28 and 30, as much as 120 tons or more, causing deformation of frame 64 and related drive components from drive assemblies 32 and 34. This deformation includes elongation of frame corner beams 66, 68, 70, and 72 (see FIG. 2). Such deformation results in a gap between respective co-acting seals on die plates 144 and 146. However, to counteract such a gap, a differential load is generated after closing platens 28, 30 and die plates 14 and 16 (see FIG. 23) with drive assemblies 26 and 27 by activating differential load source, or SASH 12 which provides a seal maintaining mechanism to upwardly force platen 30 via actuation of drive assemblies 14 and 16 and drive linkages 22 and 24 via drive motors 18 and 20, respectively. In this manner, drive assemblies 26 and 27 and SASH 12 provide a two stage force applicator. As shown in FIG. 3, drive motor assemblies 18 and 20 each drive a linear drive unit, or linear rack drive 60 and 62 that reciprocate drive linkages 22 and 24 to raise platen 30 upwardly with a differential load, or force.

Figure 4:
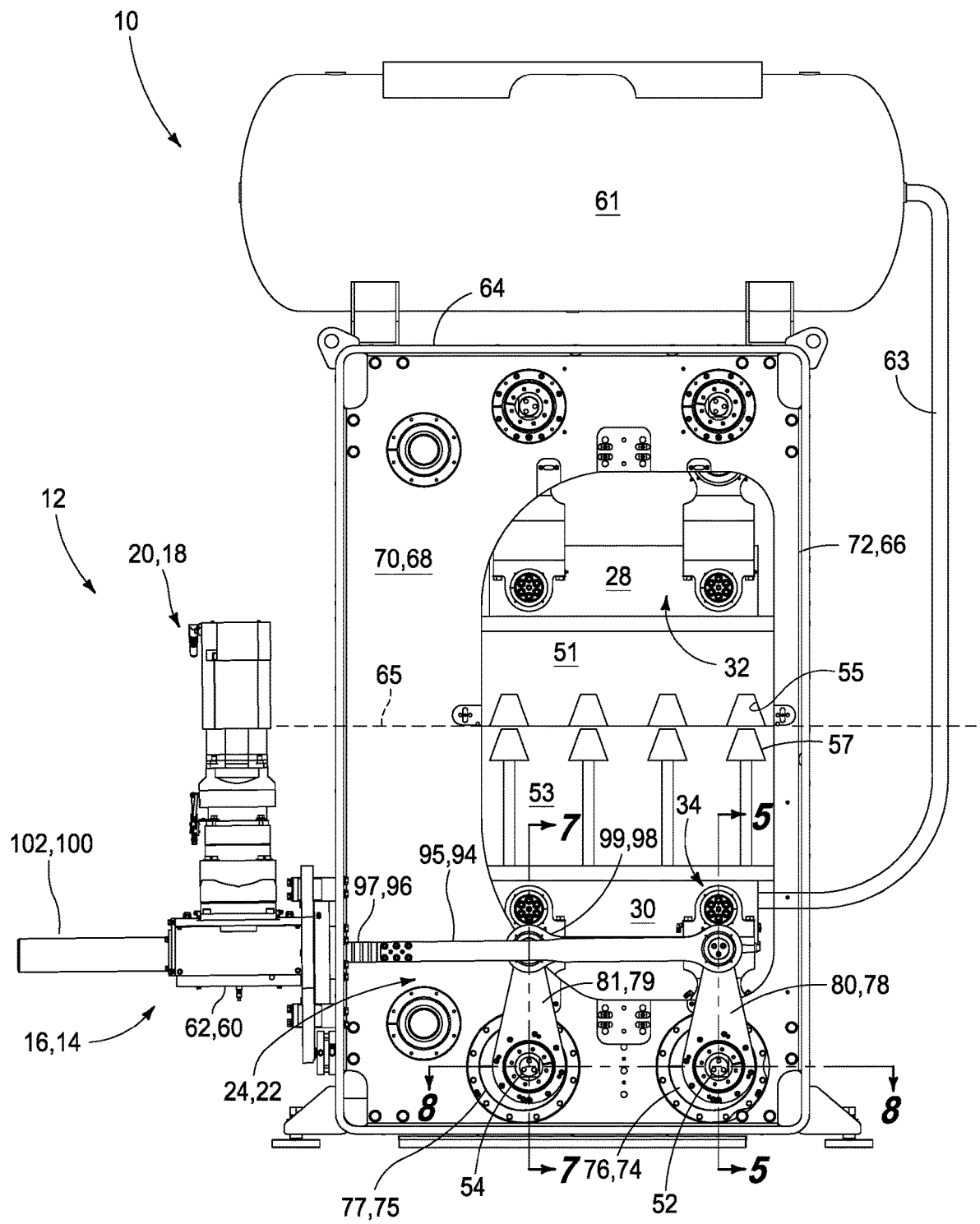
FIG. 4 is a left-side vertical view of the thermoforming machine of FIG. 2.

FIG. 4 illustrates a pneumatic source 61 of pressurized air, such as a pressure cylinder supplied from a compressor or compressed air line (not shown) on thermoforming machine 10. A pneumatic line 63 delivers pressurized air from source 61 to a manifold, or cavity within die plate 53 through individual males dies 57 to a bottom surface of a heated thermoformable sheet, or web 65, forcing the heated sheet upwardly into individual female dies 55 (along with upward movement of male dies 57). Optionally, a source of vacuum can be supplied from source 61 to a manifold on die plate 51 to draw the sheet into female mold members 55. Even further optionally, the source of vacuum can be supplied to a manifold on die plate 53, drawing the sheet onto each male die member, such as male mold members 57 (see FIG. 4). Irrespective of the manner, each of these techniques provides an article forming differential pressure application across the die faces that generates large tonnage loading and elastic deformation of frame 64. One or more seals (not shown) are provided between the contacting surfaces of die plates 51 and 53 as they are clamped together on opposed sides of sheet 65 during a thermoforming operation. In one case, sheet 65 forms a seal along an outer periphery of die plates 51 and 53 completely encompassing dies 65 and 67 between outer edges of die plates 51 and 53. Optionally, a physical seal can be placed in one of die plates 51 and 53, as currently understood in the art comprising a resilient synthetic silicon, or rubber seal. Loads of 100 tons or more can be generated between die plates 51, 53 and platens 28, 30 when using pneumatic pressure around 120 psi, causing elastic deformation of frame 64 (and legs 66, 68, 70, and 72) and drive components, such as upper platen drive assembly 32 and lower platen drive assembly 34. Optionally, a source of vacuum can be applied between die plate 51 with female die cavities 55 to draw heated sheet into individual die cavities 55. Such a vacuum also creates a large tonnage pneumatic clamping force that loads and deforms frame 64.

Before application of pressurized air from source 61 and after clamping together platens 28, 30 and die plates 51, 53, a differential load is applied to further force platen 30 upwardly against platen 28 using differential load source, or SASH 12. More particularly, motor drives 18 and 20 are activated to power drive assemblies 14 and 16 to activate linear drive units, or rack drives 60 and 62 to reciprocate drive linkages, or kinematic linkages 22 and 24 comprising linear racks 96 and 97 and connected drive links 94 and 95 to and fro to oscillate drive arms 78-81 in unison on each side via follower, or connecting links 98 and 99. Eccentric bodies 74-77 carry toggle shafts 52 and 54 such that pivoting of arms 77-81 in one direction raises shafts 52 and 54, upwardly lifting platen 30 and imparting differential pressure, or upward load between die plates 51 and 53.

Figure 5:
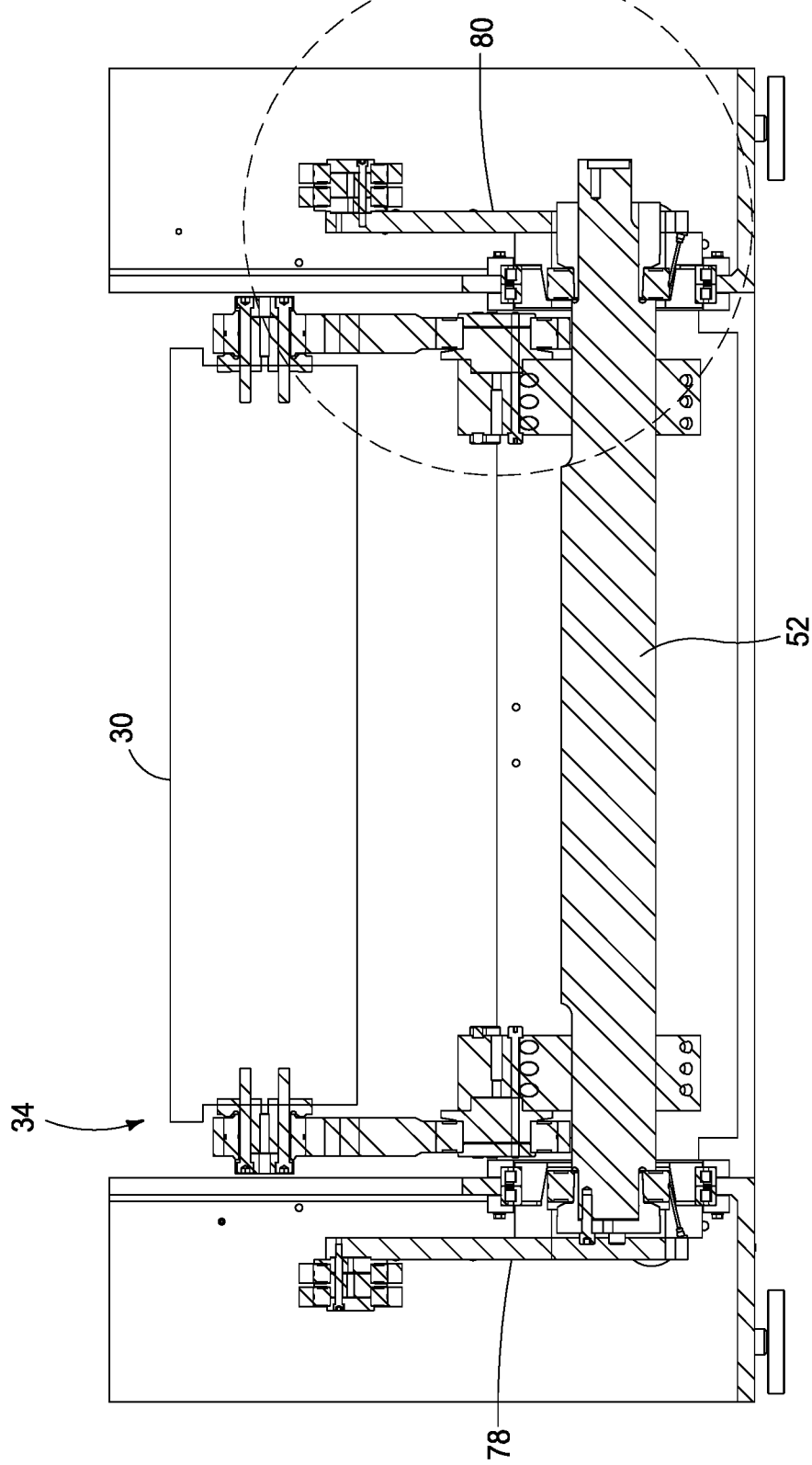
FIG. 5 is a vertical sectional view of the SASH drive linkage, drive shaft and platen taken through line 5-5 of FIG. 4.
Figure 6:
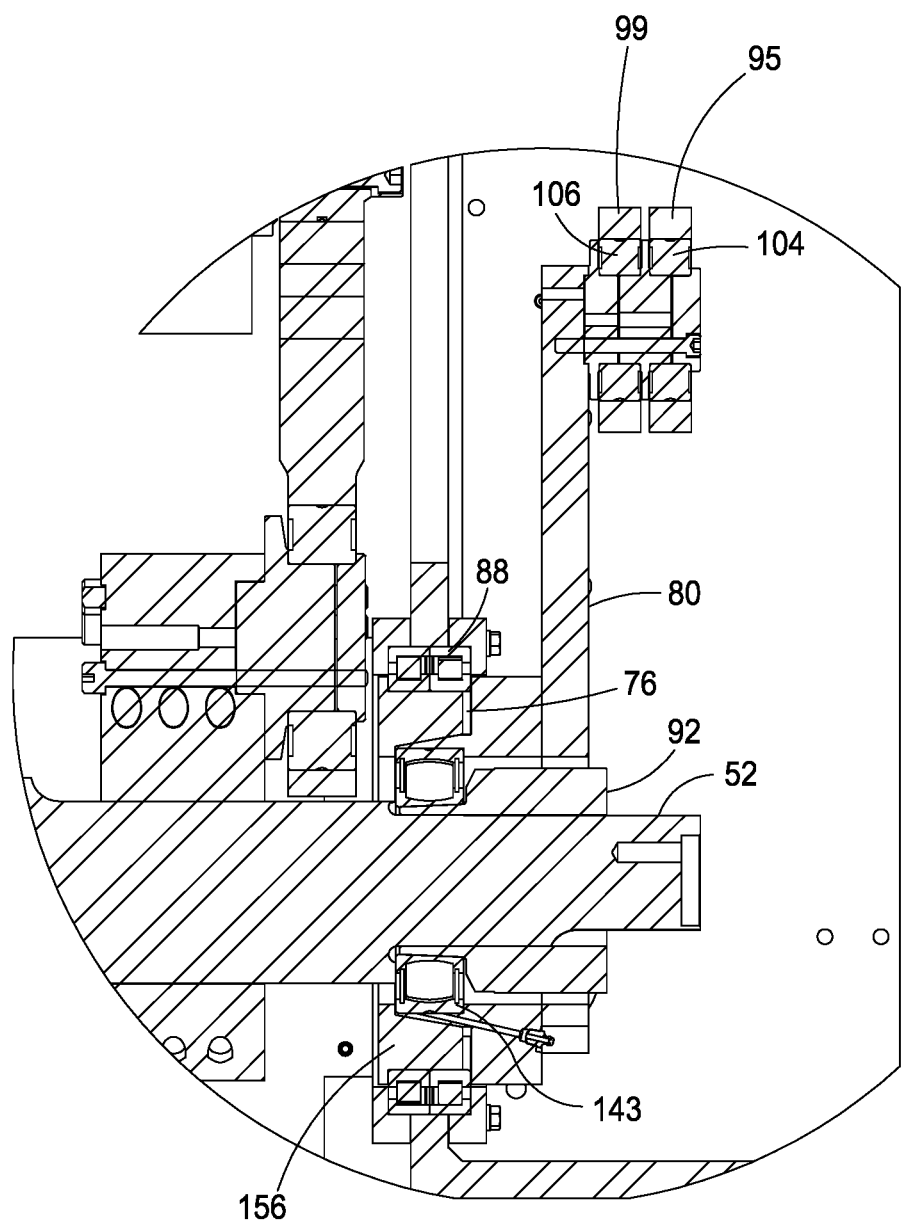
FIG. 6 is an enlarged vertical sectional view of the SASH drive linkage and drive shaft taken from the encircled region 6 of FIG. 5.
Figure 7:
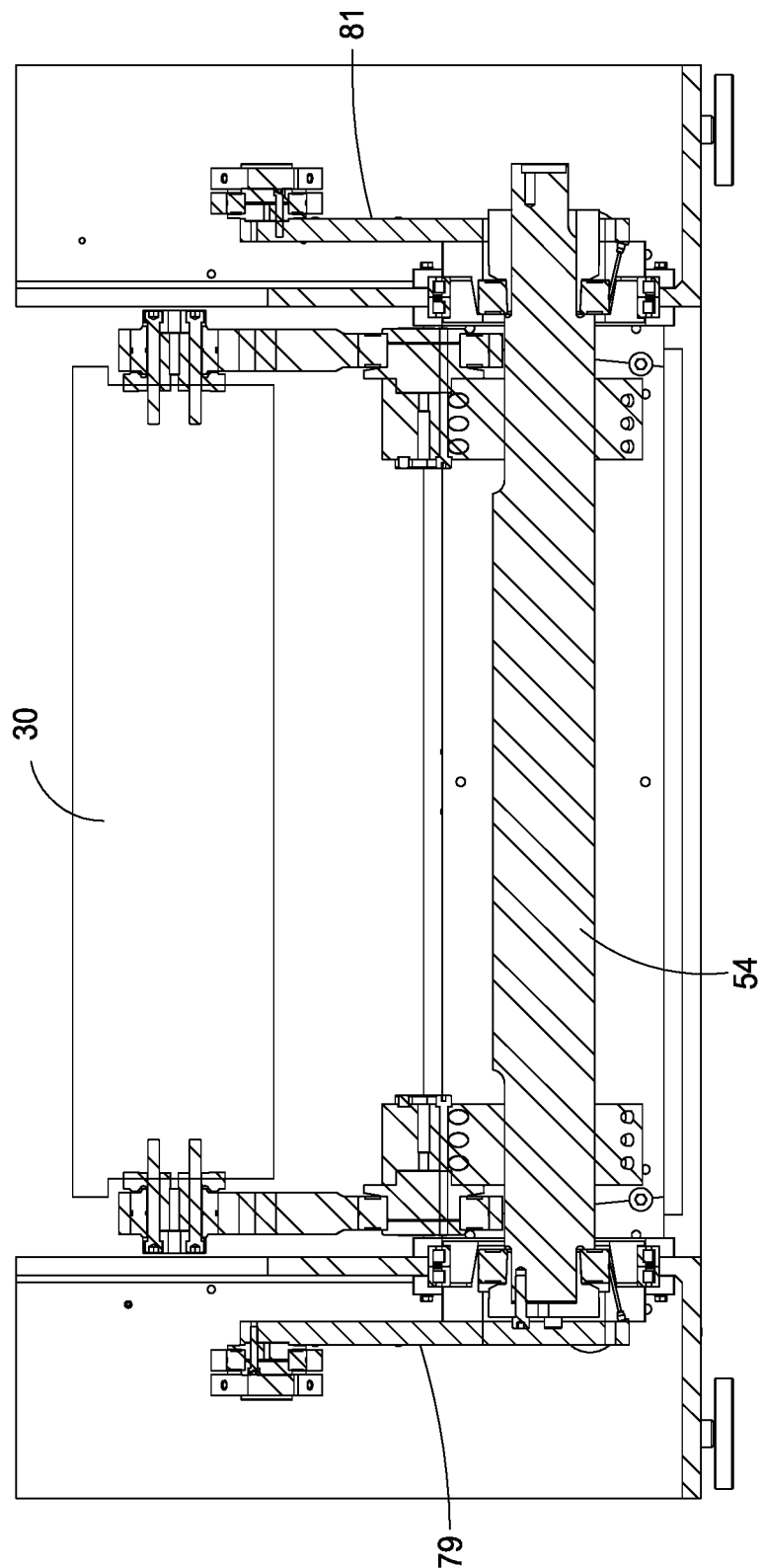
FIG. 7 is a vertical sectional view of the SASH drive linkage, drive shaft and platen taken through line 7-7 of FIG. 4.
Figure 8:
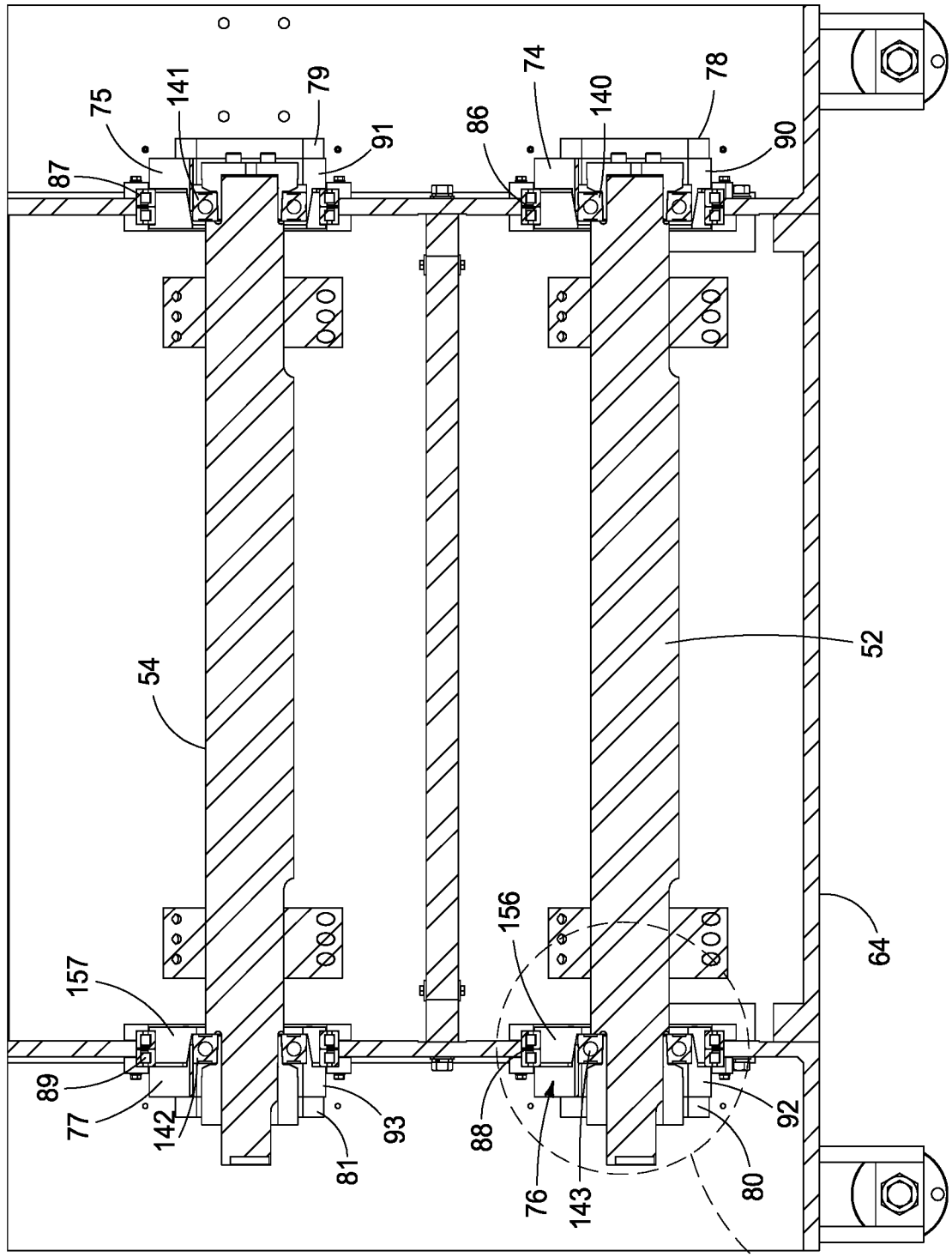
FIG. 8 is a vertical sectional view of the SASH drive linkage, drive shaft and platen taken through line 8-8 of FIG. 4.

FIGS. 5-9 illustrate the arrangement of toggle drive shafts 52 and 54 relative to drive arms 78,80 and 79,81 for applying differential pressure by raising lower platen 40. As shown in FIGS. 5 and 7, platen 30 is supported via lower platen drive assembly 34 to be elevated by pivoting toggle drive shafts 52 and 54 through pivoting of drive arms 78, 80 and 79, 81.

FIG. 6 illustrates the mounting details of drive arm 80 onto toggle drive shaft 52. More particularly, an inner end of drive arm 80 is affixed to a tapered inner bearing bushing 92 received within a toggle bearing, or a self-aligning spherical roller bearing 143 against an inner raceway of bearing 143. Eccentric body 76 has a similar taper that seats against an outer raceway of bearing 143. Toggle drive shaft 52 is carried eccentrically within male bevel aperture eccentric body 76 and female bevel aperture eccentric body 156 relative to an inner raceway of a pair of side-by-side SASH bearings, or roller bearings 88. In this way, as arm 80 is pivoted, shaft 52 can be raised and lowered, thereby raising and lowering the lower platen (not shown). An outer end of arm 80 has a pair of bearing blocks that affix to an inner raceway of bearings 104 and 106, which are affixed along an outer raceway to one end of a drive link 95 and follower linkage 99.

Figure 9:
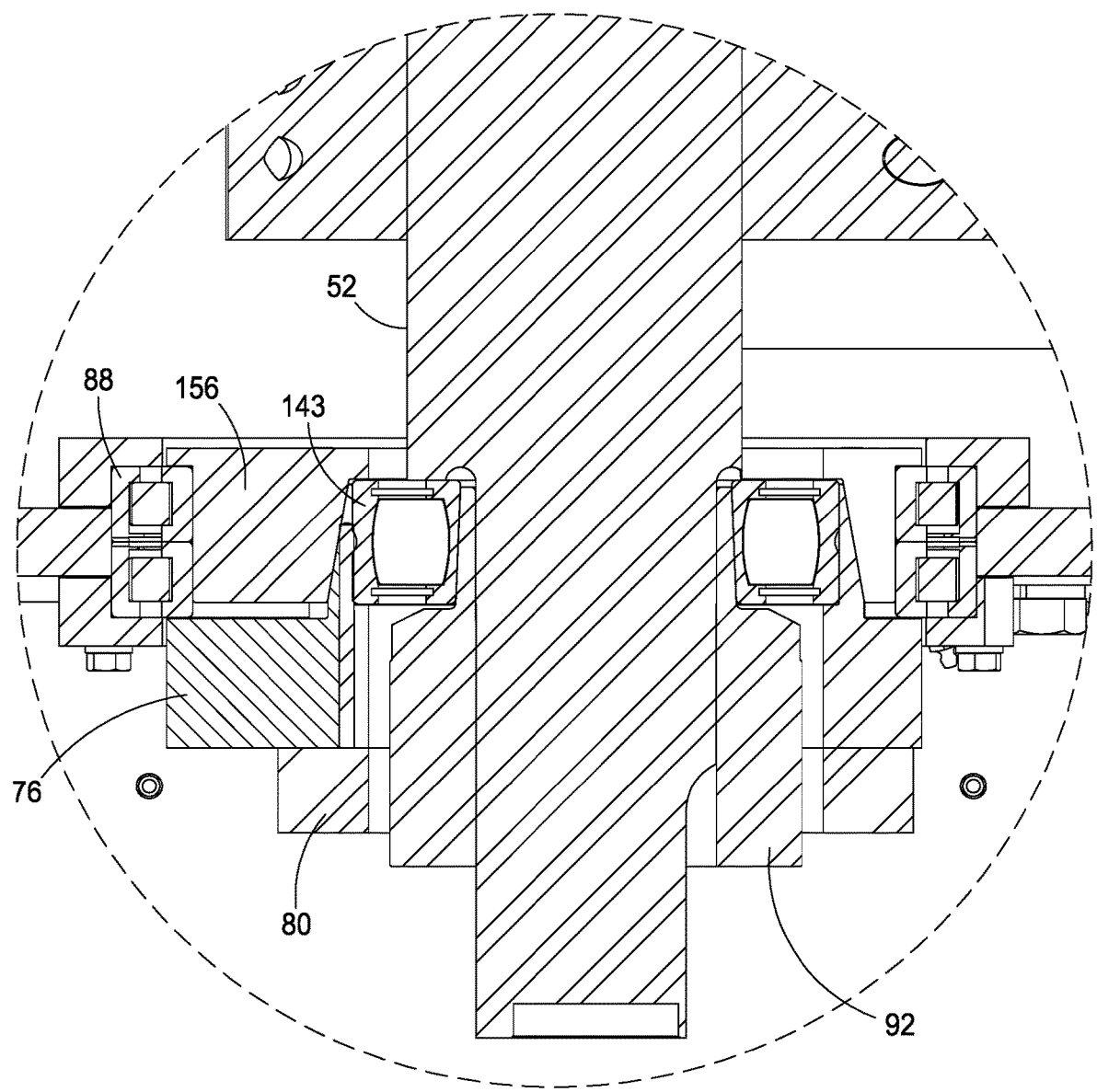
FIG. 9 is an enlarged vertical sectional view of the SASH drive linkage and drive shaft taken from the encircled region 9 of FIG. 8.

In FIG. 9, toggle drive shaft 52 is shown in a centerline sectional view taken perpendicular to the view shown in FIG. 6. More particularly, an inner end of drive arm 80 is affixed to tapered inner bearing bushing 92 received within toggle bearing 143 against an inner raceway of bearing 143. Eccentric body 76 has a similar taper that seats against an outer raceway of bearing 143. Toggle drive shaft 52 is carried eccentrically within male bevel aperture eccentric body 76 and female bevel aperture eccentric body 156 relative to an inner raceway of a SASH bearing 88. In this way, as arm 80 is pivoted, shaft 52 can be raised and lowered, thereby raising and lowering the lower platen (not shown). An outer end of arm has a pair of bearing blocks that affix to an inner raceway of bearings 104 and 106, which are affixed along an outer raceway to one end of a drive link 95 and follower linkage 99.

Figure 10:
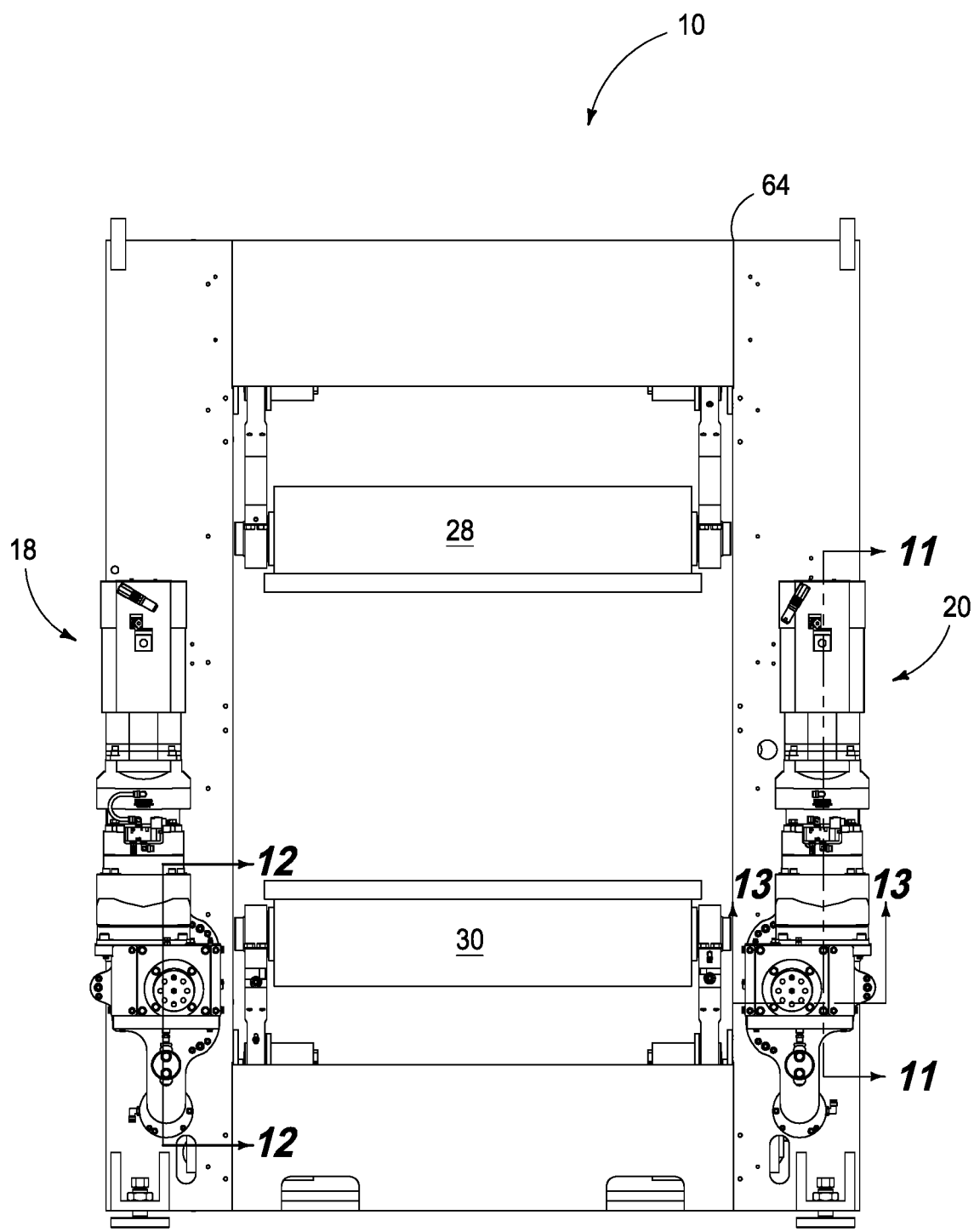
FIG. 10 is a downstream end vertical view of the thermoforming machine shown in FIG. 2.

FIG. 10 shows details of drive motor assemblies 18 and 20 on a downstream end of thermoforming machine 10. Platens 28 and 30 are shown in a closed position without respective die plates being installed. Drive motor assemblies 18 and 20 are mirror image designs to one another.

Figure 11:
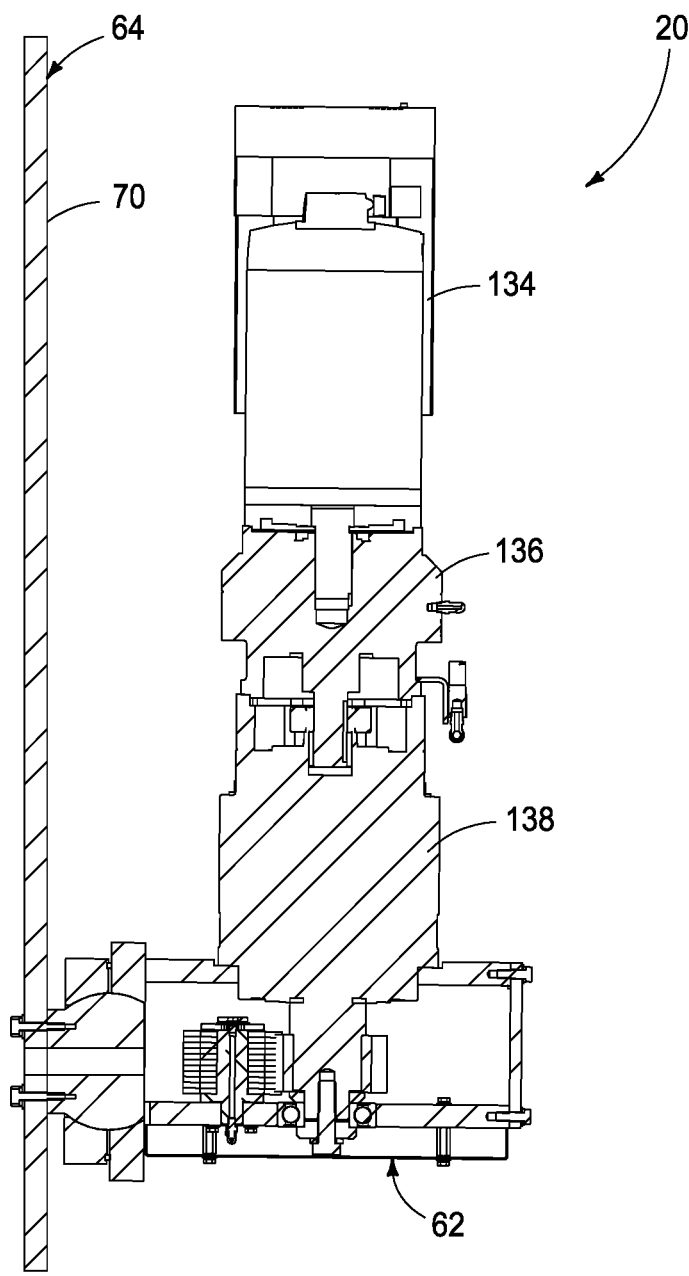
FIG. 11 is a vertical sectional view of one of the SASH drive motor assemblies taken along line 11-11 of FIG. 10.

FIG. 11 shows details of drive motor assembly 20 including a servo motor 134, an air brake 136, and a planetary gearbox 138. Gearbox 138 drives a pinion gear 110 (see FIG. 15) inside of linear drive unit 62 that reciprocates drive linkage 22 (see FIG. 3). Linear drive unit 62 is affixed to frame portion, or leg 70 of frame 64. Drive motor assemblies 18 and 20 can be independently operated so SASH 12 (see FIG. 1) is also capable of adjusting the height on the left or right side of the lower platen 30 independently while in coining mode.

According to one construction, servo motor 134 is a Siemens Servomotor (Model No. 1FT7108-5SC71-1BA0) available in the United States from Siemens Corporation, 300 New Jersey Avenue, Suite 1000, Washington, D.C. 20001 United States. Air brake 136 is a product no. D6C2K-003 Mach III spring engaged air release brake available from MACH III CLUTCH, INC., 101 Cummings Drive, Walton, Ky. 41094 USA. Gearbox 138 is a Wittenstein 20:1 Planetary Gearbox (Model No. SP240S-MF2-20) available in the United States from WITTENSTEIN holding Corp. 1249 Humbracht Circle IL 60103 Bartlett.

Figure 12:
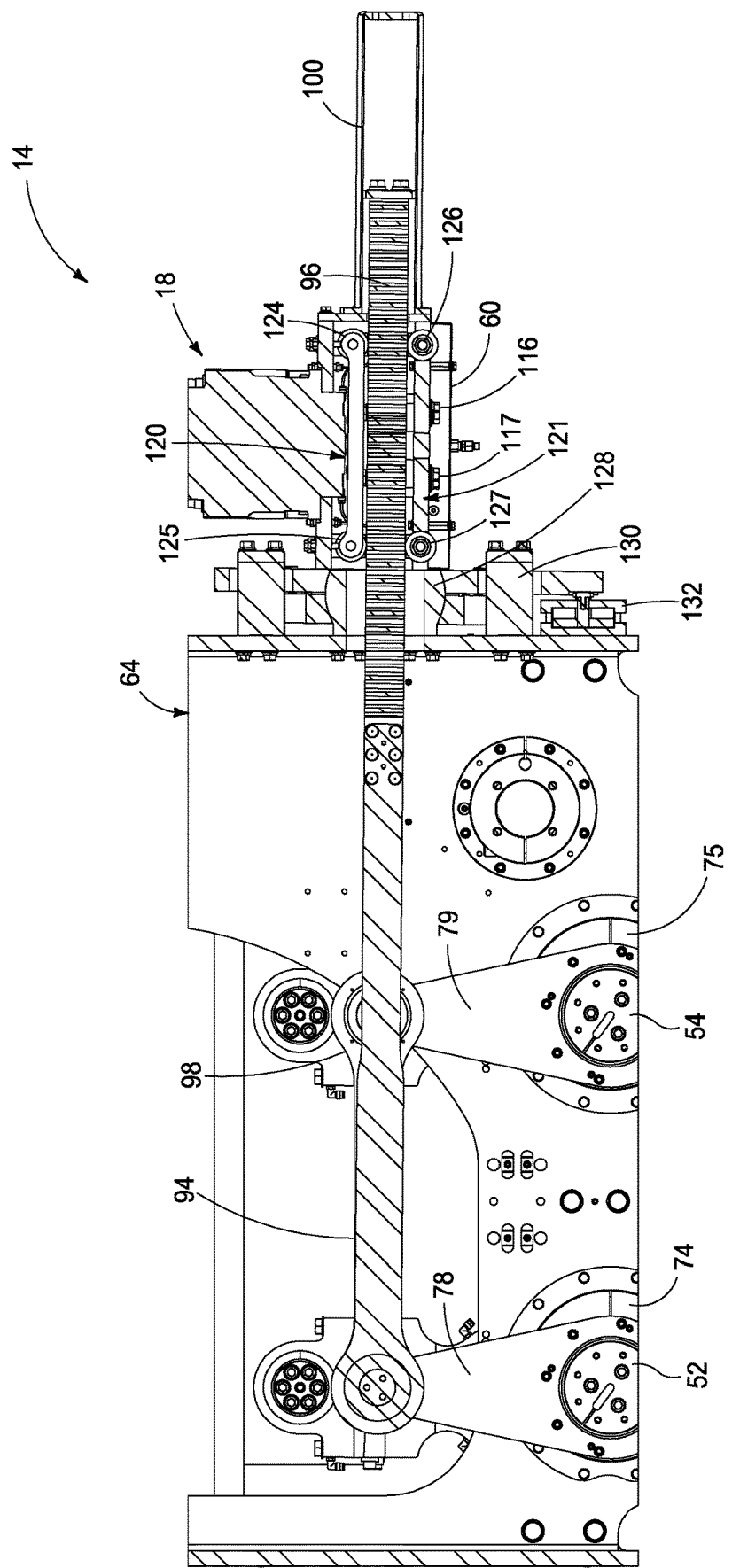
FIG. 12 is a vertical sectional view of one of the SASH drive assemblies taken along line 12-12 of FIG. 10.

FIG. 12 shows details of drive assembly 14 including opposite drive motor assembly 18 which affixes to and drives linear drive unit 60 to reciprocate to and from SASH drive gear rack 96 and drive link 94 to reciprocate drive arms 78 and 79. Connecting link 98 couples together drive arms 78 and 79 to join together reciprocation of arms 78 and 79 such that toggle drive shafts 52 and 54 are raised and lowered together from torque applied via drive arms 78 and 79 to rotate eccentric bodies 74 and 75. A pair of guide cars 120 and 121 cooperate to axially guide SASH drive rack 96 in linear reciprocation, along with a pinion gear (not shown, but similar to pinion gear 110 of FIG. 13) that cooperates with a pair of spaced-apart cam follower bearings 116 and 117 (similar to cam follower bearings 118 and 119 of FIG. 13). Guide cars 120 and 121 each include a pair of spaced apart cam follower bearings 12, 125 and 126, 127, respectively. A hardened steel pivotal mount 128 enables SASH drive rack 96 to reciprocate with a slight pitch of drive link 94 as a distal end of link 94 follows an arcuate path along a distal end of drive link 78. A corresponding complementary hardened surface is provided on the frame where mount 128 is received. A pair of torque arm stops are provided at opposed ends of a torque arm, such as stop 130, to prevent, or resist rotation of drive motor assembly 18 and linear drive unit 60 due to motor torque. A counterbalance cylinder 132 is provided between the torque arm (between the pair of stops 130) and frame 64. The counterbalance cylinder 132 is responsible for counteracting the overhanging load of the motor assembly 18, linear drive unit 60, and other drive components.

Figure 13:
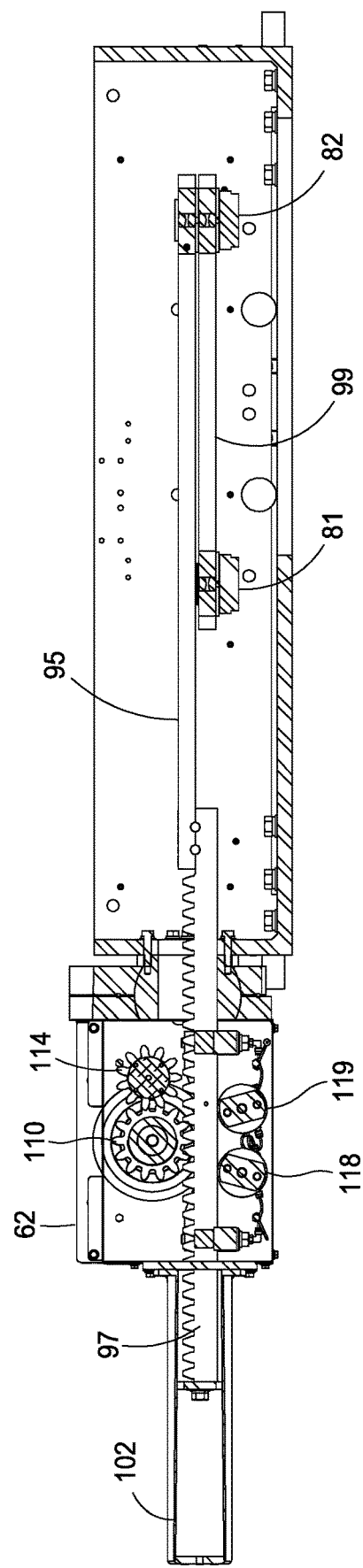
FIG. 13 is a horizontal sectional view of the SASH drive assembly of FIG. 11 taken along line 13-13 of FIG. 10.

FIG. 13 further illustrates details of linear drive unit 62, SASH drive rack 97 and drive link 95. Link 95 drives drive linkages 81 and 80, joined via connecting link 99, to reciprocate drive linkage 24 (see FIG. 4). Pinion gear 110 is provided by planetary gearbox 138 (see FIG. 11) of drive motor assembly 20 (see FIG. 4). In addition, a felt lubricator 114 is geared to the pinion 110 in order to contain and distribute lubricant, such as oil, to keep the pinion 110 and rack 97 properly lubricated. A pair of spaced-apart cam follower bearings 118 and 119 guide rack 97 against rotating pinion 110 for axial reciprocation relative to linear drive unit 62. Finally, hollow tubular housing is affixed to a housing of linear drive unit 62 to form a physical guard that protects human operators from injury as rack 97 reciprocates to and fro.

Figure 14:
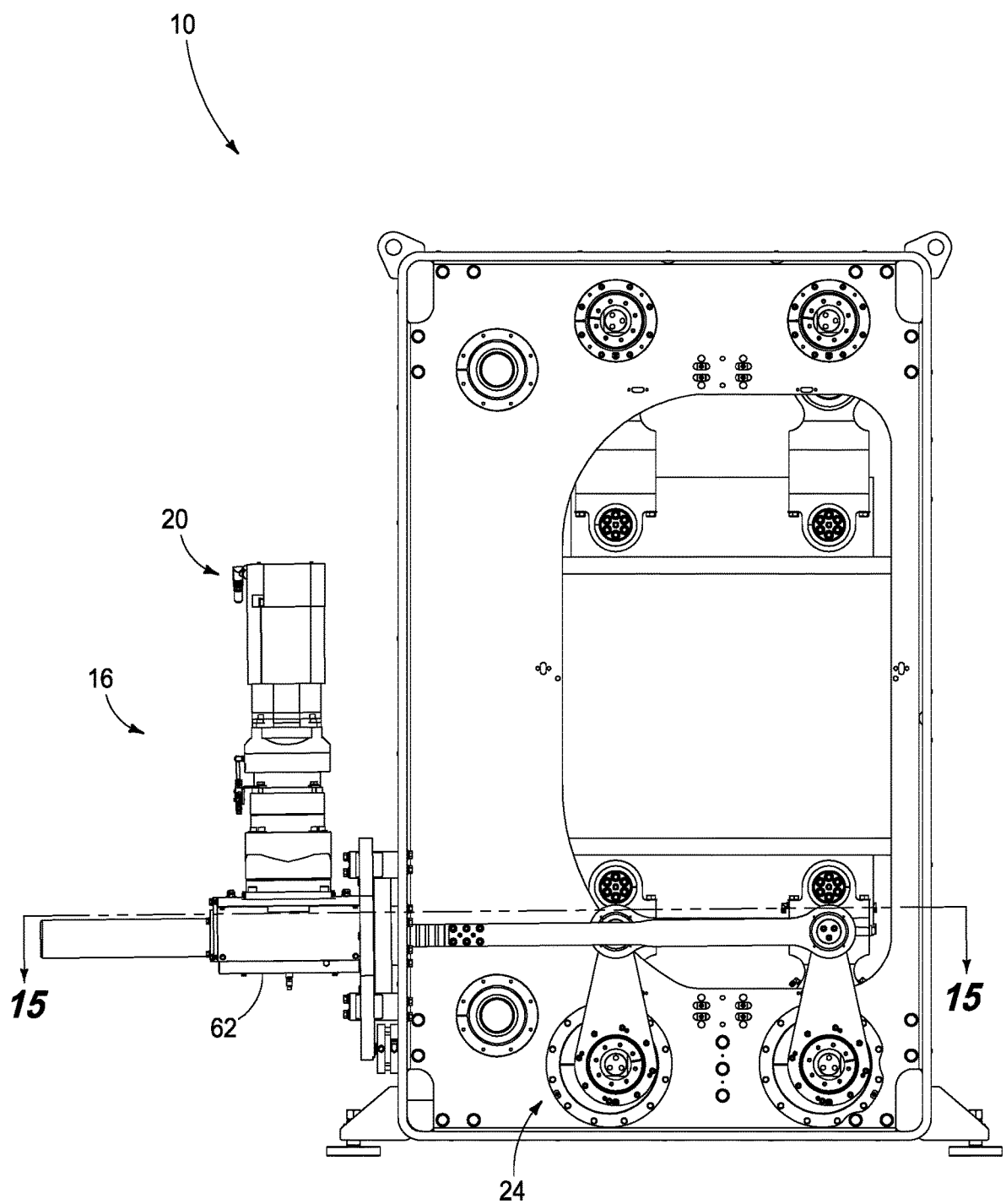
FIG. 14 is a left-side view of the thermoforming machine of FIG. 2.
Figure 15:
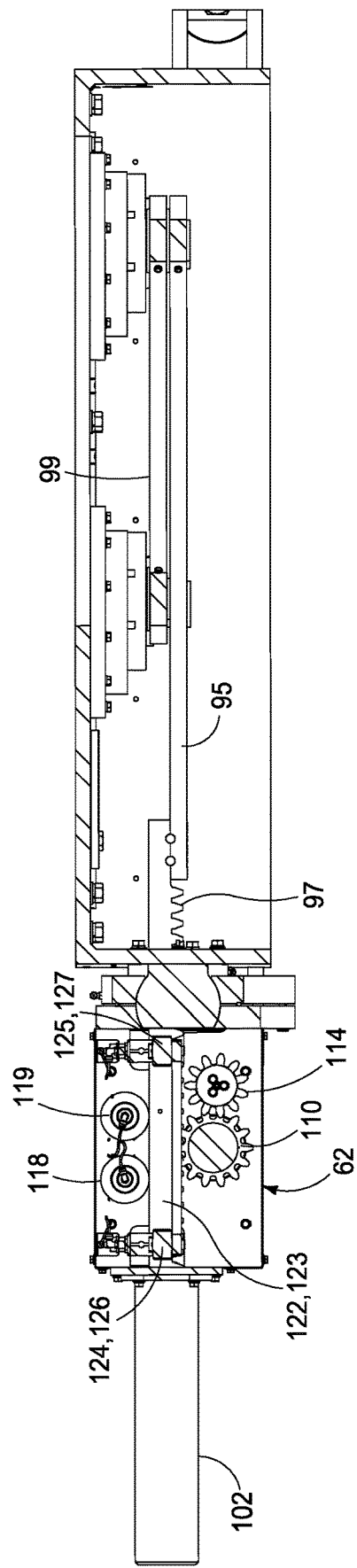
FIG. 15 is a horizontal sectional view of one of the SASH drive assemblies taken along line 15-15 of FIG. 14.

FIG. 14 further illustrates drive assembly 16 of thermoforming machine 10 with drive motor assembly 20 reciprocating drive linkage, or kinematic linkage 24 via action of linear drive unit 62. As shown in FIG. 15, pinion gear 110 of drive motor assembly 20 (of FIG. 14) is rotated clockwise and counterclockwise in linear drive unit 62 to reciprocate SASH linear drive rack 97 to and fro along with drive link 95. Link 95 is keyed to rack 97 with two cylindrical pins and bolted together with a plurality of fasteners. Cam follower bearings 124, 125 on guide car 122 and cam follower bearings 126, 127 on guide car 123 cooperate to constrain any movement of SASH drive rack 97 in one direction, while cam follower bearings 118 and 119 cooperate with pinion gear 110 to constrain rack 97 in a perpendicular direction. Felt oiler gear 114 rotates in engagement with pinion gear 110 to lubricate gear 110 and rack 97. Finally, guard 102 protects human operators from injury due to reciprocation of rack 97.

Figure 16:
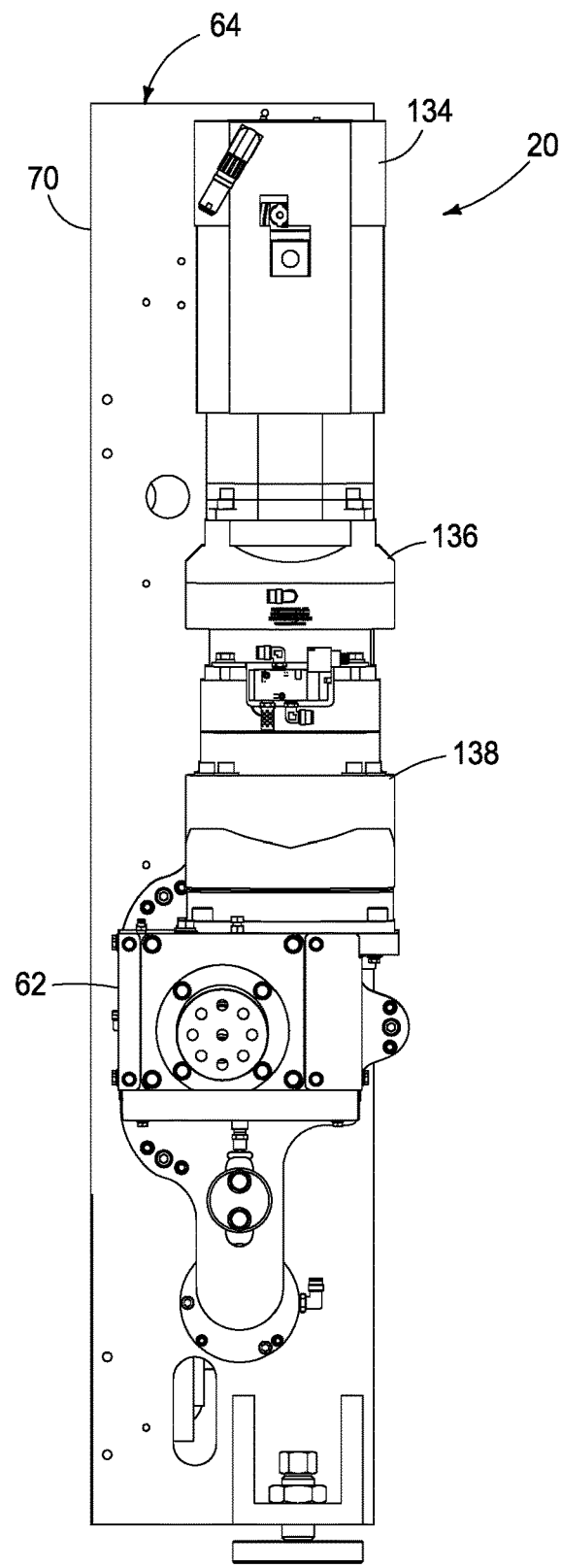
FIG. 16 is an enlarged partial view of the thermoforming machine right-side drive motor assembly shown in FIG. 10.
Figure 17:
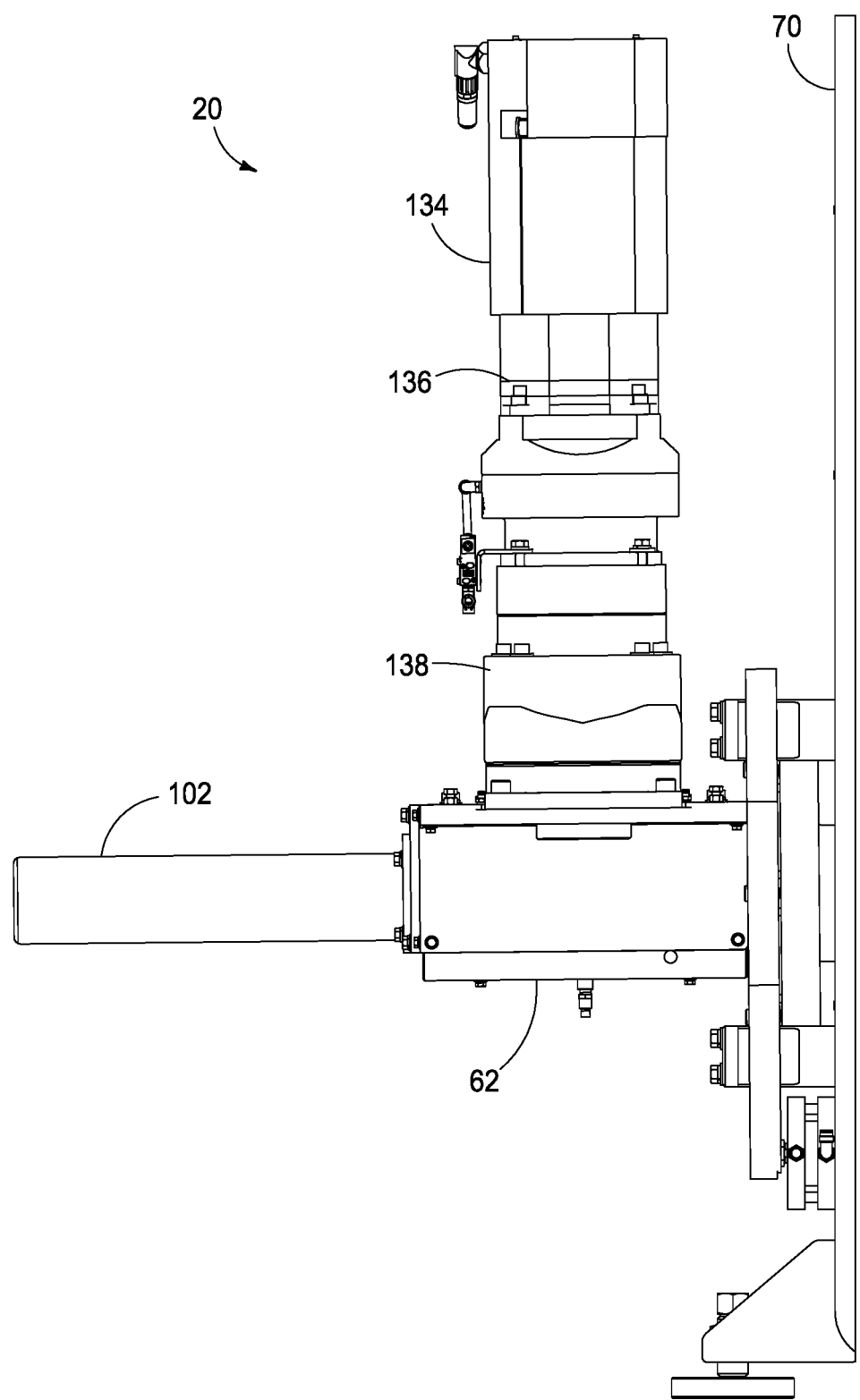
FIG. 17 is a right-side view of the drive motor assembly shown in FIG. 16.
Figure 18:
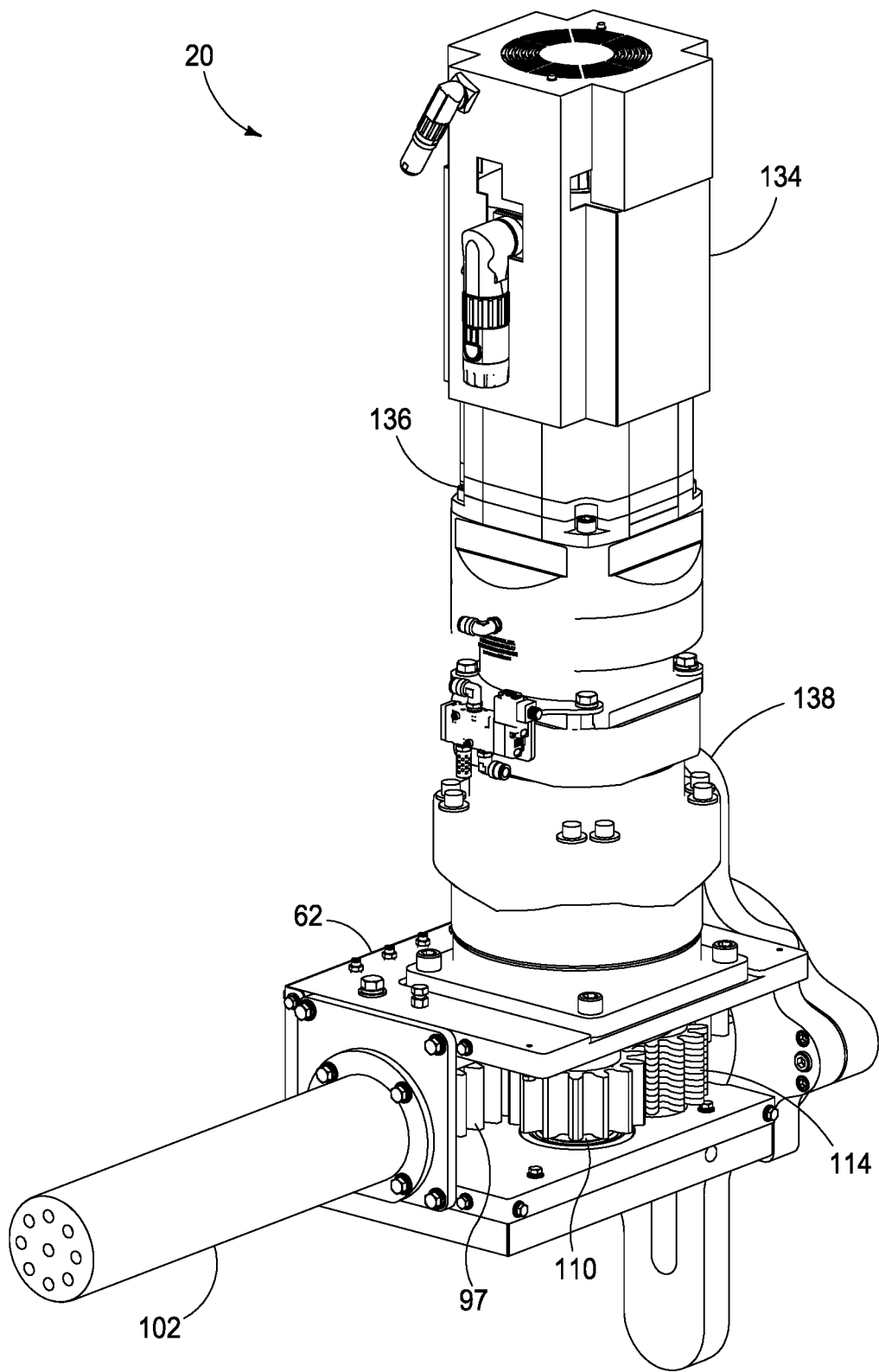
FIG. 18 is an upstream right-side perspective view from above of the drive motor assembly of FIGS. 16-17.
Figure 19:
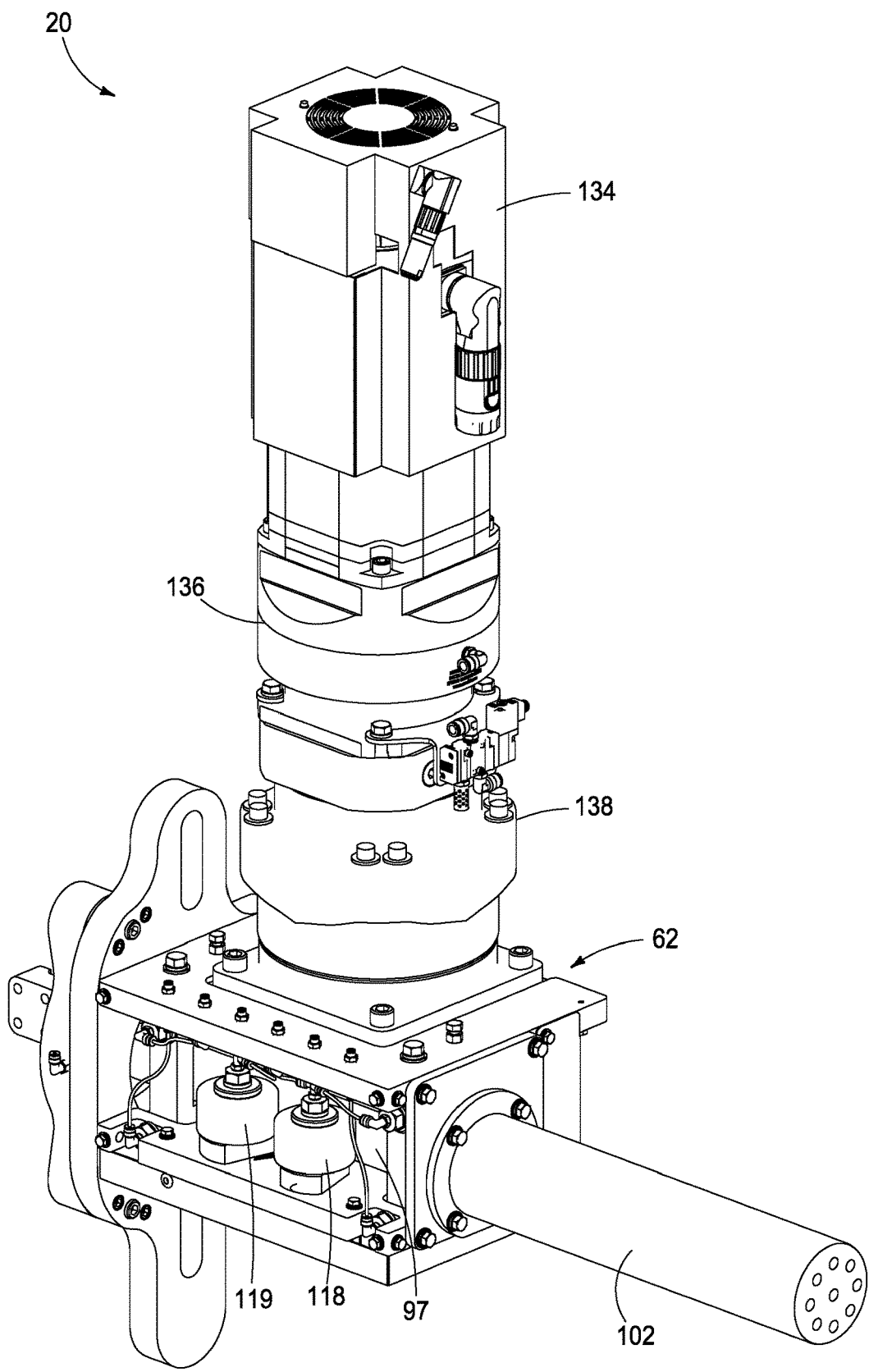
FIG. 19 is an upstream left side perspective view from above of the drive motor assembly of FIGS. 16-18.

FIGS. 16-19 show details of drive motor assembly 20 affixed to vertical leg 70 of frame 64 (see FIGS. 16-17). Servo motor 134 drives linear drive unit 62 to accurate positions in response to a computer control system (not show) that receives input signals from a sensor that measures deformation from a top position to a bottom position across the frame where the platen drive linkages affix, as shown in FIG. 6. Such elastic deflection data is input to the control system to generate a corresponding output from the servo motors of assemblies 18 and 20 to generate a desired differential load after the platens and dies have been closed together with the platen drive assemblies 26 and 27. In this way, the die surfaces will not bang together when dry cycling the platens and dies plates as the differential pressure will not be applied when dry cycling. Servo motor 134 drives planetary gear box 138 with a corresponding input signal from the control system to a desired level to retract linear drive unit 62, as shown in FIGS. 16-18. Air brake 136 is released when the desired force level is achieved, thereby locking the air brake and holding the desired level of load force to articulated drive linkage 24 and raised platen 30 and die plate 53 just before air pressure is applied to the thermoformable web.

Figure 20:
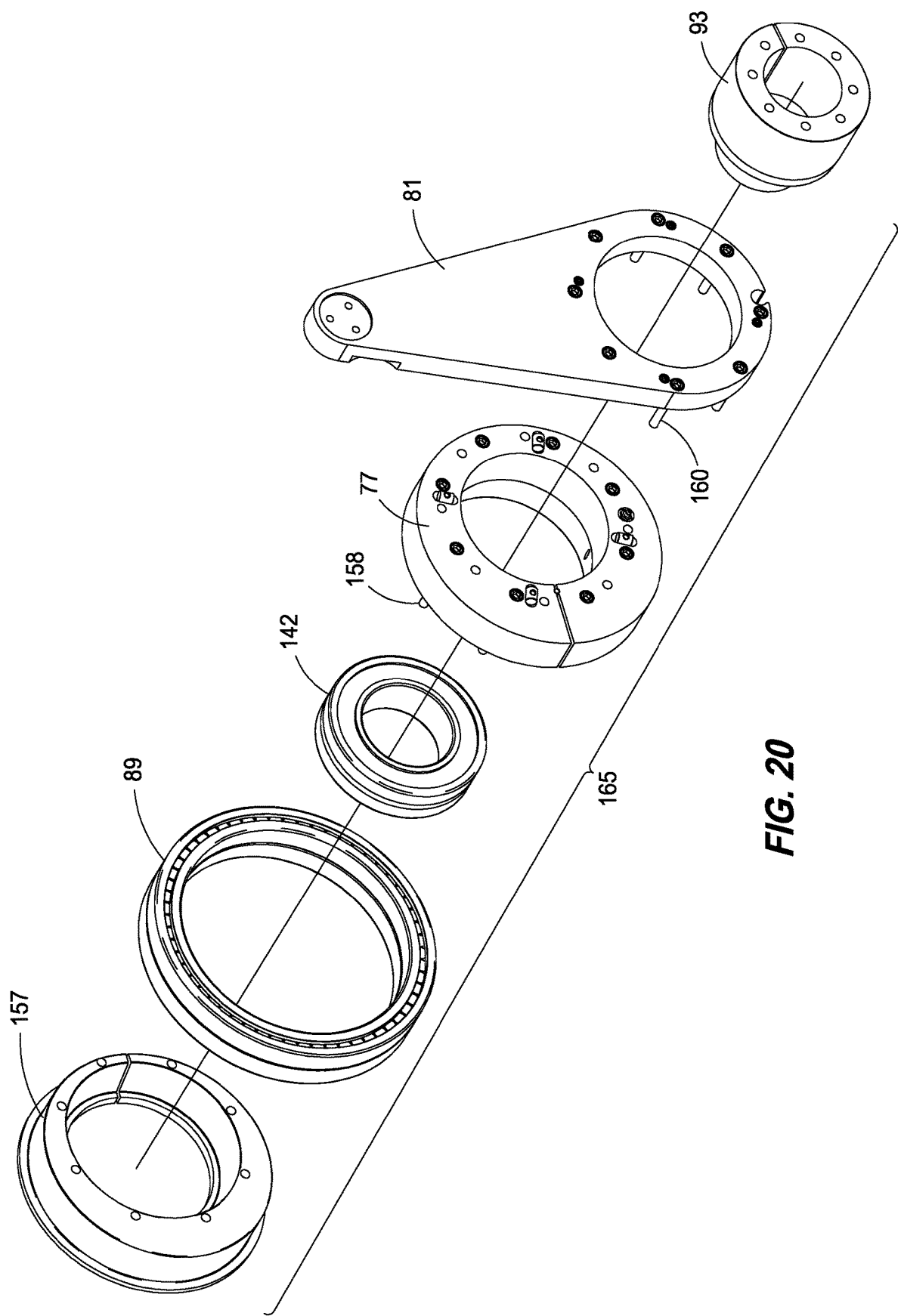
FIG. 20 is an exploded perspective view from outside of an eccentric drive arm and bearing assembly.
Figure 21:
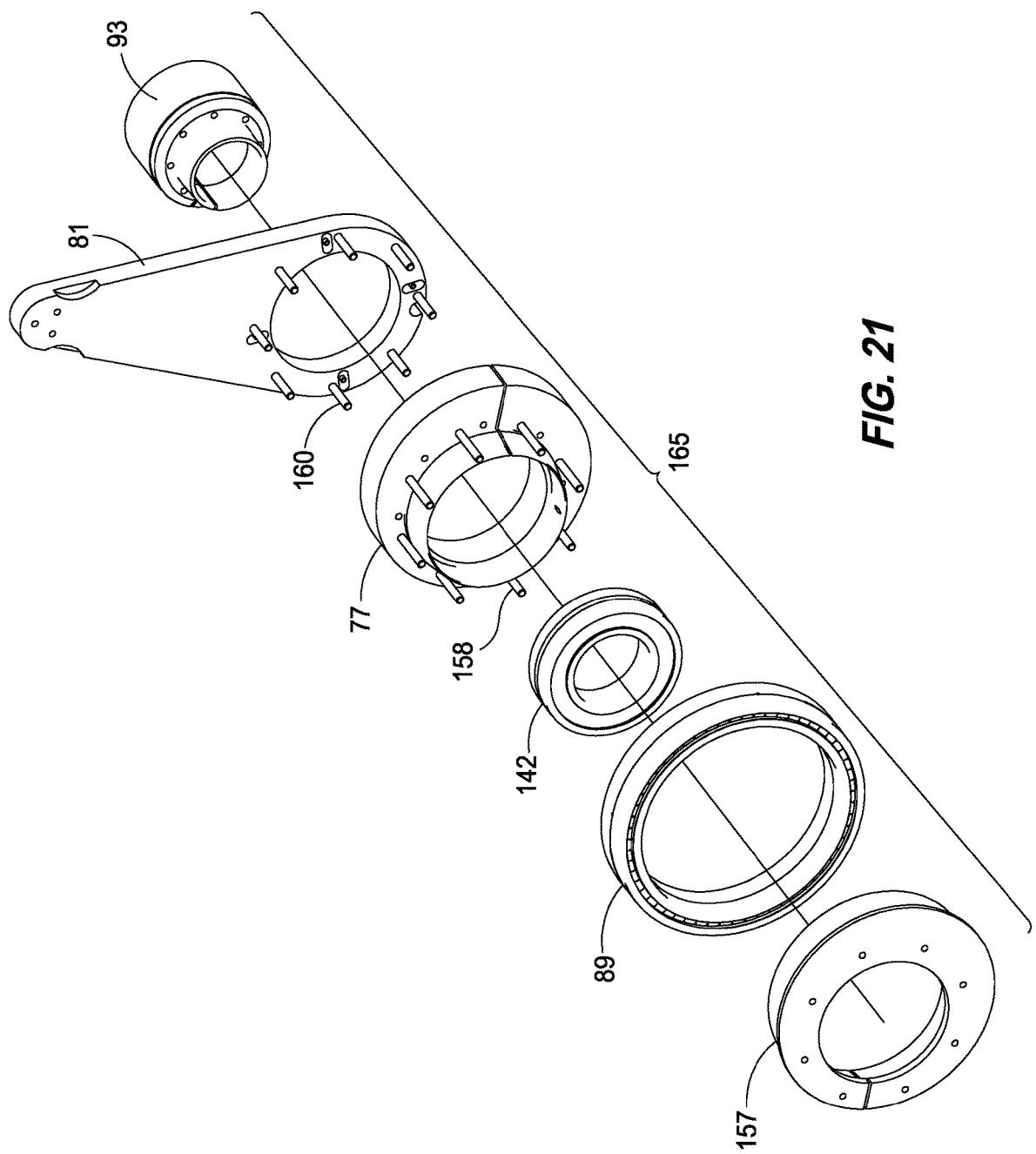
FIG. 21 is an exploded perspective view from inside of an eccentric drive arm and bearing assembly.

FIGS. 20 and 21 illustrate in exploded perspective view from outside and inside directions an eccentric drive arm and bearing assembly 165. More particularly, assembly 165 includes a SASH bearing 89, a toggle shaft bearing 142, male eccentric body 77, female eccentric body 157, crank arm 81, and tapered inner bearing bushing 93. Male eccentric body 77 includes a cylindrical outer diameter surface and an eccentrically located, or non-coincident central axis for an inner diameter surface, and an inner diameter cylindrical flange having a tapered outer circumferential surface. Likewise, female eccentric body 157 includes a cylindrical outer surface and an eccentrically located, or non-coincident central axis, an inner diameter surface, and an inner diameter cylindrical flange having a tapered inner circumferential surface that mates in engagement with the corresponding tapered outer circumferential surface of male eccentric body 77. FIG. 9 illustrates in enlarged view the assembly for another eccentric drive arm and bearing assembly constructed in the same manner as assembly 165, having analogous male eccentric body 76 and female eccentric body 143 (see FIG. 9).

Inner bearing bushing 93 has an inner diameter cylindrical flange with a tapered outer circumferential flange surface. An inner surface of the inner raceway on bearing 142 has a complementary tapered inner circumferential flange. In assembly, the outer circumferential flange on bushing 93 seats with the inner circumferential flange on the inner raceway of bearing 142 to provide tight fit-up there between. More particularly, bushing 93 is press fit within an inner raceway of bearing 142 via such tapered outer circumferential flange. A circumferential array of through holes in bushing 93 are provided to receive jack screws (not shown) for removing the bushing 93 from assembly. Crank arm 81 is affixed in assembly with a plurality of threaded fasteners, or bolts 160 in a circumferential array with male eccentric body 77. Likewise, male eccentric body is affixed in assembly with a plurality of threaded fasteners, or bolts 158 to female eccentric body 157. Both bodies 77 and 157 have a radial slot, each 180 degrees offset from one another, to enable assembly by breaking a hoop structure of each body 77 and 157 to facilitate insertion and removal.

FIG. 22 is a left-side view of the thermoforming machine 10 of FIG. 1 including the components of the platen drive assemblies 26 and 27 (see FIG. 1) showing the die plates 51 and 53 in a fully open position and SASH 12 in a home, or unloaded position. More particularly, drive assemblies 14 and 16 of SASH 12 show drive motor assemblies 18 and 20, respectively, extending out racks 96 and 97 via linear drive units 60 and 62 such that drive links 94 and 95 rotate drive arms 78, 80 and 79, 81 forward to lower toggle shafts 52 and 54 by rotating eccentric bearing assemblies 162, 164 and 163, 165. Arms 78, 80 and 79,81 rotate together connected via follower arms 145, 147, respectively. Left drive linkage 24 can be rotated the same as right drive linkage 22 (see FIG. 1). However, it is understood that the left and right linkages can be rotated to closed (and other) positions that differ in order to adjust left and right loading across a pair of engaged die plates 51 and 53. Finally, platen drive assemblies 32 and 34, driven by platen drive shafts 41 and 43, reciprocate toggle shafts 48, 50 and 52, 54, respectively, in order to intermittently oscillate together and apart die plates 51, 53 and platens 28 and 30.

A control scheme is shown implementing control system 192 to control operation, motion, and force loading of platens 28 and 30 and die plates 51 and 53 in FIG. 22. More particularly, control system 192 includes processing circuitry 194, such as one or more processors, and memory 196 that are implemented via a thermoforming machine control system and user interface. A load deformation sensing apparatus 182 is provided extending between a top location and a bottom location on frame 64 configured to detect very minute elastic deformation between such two locations resulting from forming loads applied from pneumatic pressure, or vacuum from pneumatic source 61 (see FIG. 4) during a thermoforming operation.

In order to detect deformation of frame 64, a linear variable differential transformer (LVDT) sensor 184 is affixed atop a thermally stable, inelastic rod 183 housed freestanding and spaced apart from a stainless steel cylindrical tube extending between the two frame positions, or locations where rod 183 is affixed at a bottom location and sensor 184 is affixed at a top location in contact with a top surface of rod 183. Sensor 184 detects relative movement of frame 64 from elastic deformation by measuring position of the top of rod 183 relative to sensor 184. In one case, a stainless steel cap is provided atop rod 183 with a concavity for receiving a measuring tip on sensor 184. In one case, rod 183 is formed from a carbon fiber rod. In another case, a laser beam can be used to detect minute elastic (or plastic) deformation of frame 64.

Sensor 184 of FIG. 22 generates an output signal 186 that is input to control system 192. In response to the detected and measured deformation of frame 64, control system 192 generates an output signal 190 to drive differential load source, or SASH 12 to actuate right and left drive assemblies 14 and 16, together or independently. This action imparts rotation to eccentric cam assemblies 162, 164 and 163, 165 to raise toggle shafts 52 and 54 relative to toggle shafts 48 and 50, thereby imparting, or applying a differential load, or force between die plate 53 and frame 64. This force is configured to impart a closing force, or closing differential displacement to die plate 53 towards die plate 51 sized to at least counteract structural separation between die plates 51 and 53 resulting from structural deformation from forming pressure between die plate 53 and die plate 51 during a forming operation. Furthermore, one or more output signals 188 are generated from control system 192 to drive upper drive assembly 26 and lower drive assembly 27 at desired times. In one case, control system 192 sends signal 188 to close platens 28 and 30 and die plates 51 and 53 before signal 190 is sent to actuate SASH 12 to a level, or force that largely or completely counteracts the detected deformation of frame 64 from sensor 184 measuring relative motion with top end of rod 183 of sensing apparatus 182.

As shown in FIG. 22 (and in the remaining drawings herein), such drawings are to scale with the same units in the X and Y axes. Furthermore, one exemplary construction has a vertical height for frame 64 of 100 inches measured from the top surface of the top to the bottom surface of the bottom of frame 64, but excluding the legs and the lifting eyes.

FIG. 23 is a left-side view of the thermoforming machine 10 of FIG. 1 including the components of the platen drive assemblies 26 and 27 (see FIG. 1) showing the platens 51 and 53 in a fully closed position and SASH 12 in a home, or unloaded position. In such position, upper platen drive assembly 32 and lower platen drive assembly 34 still have a ⅛th inch gap between respective bottom and top die plate surfaces.

Figure 24:
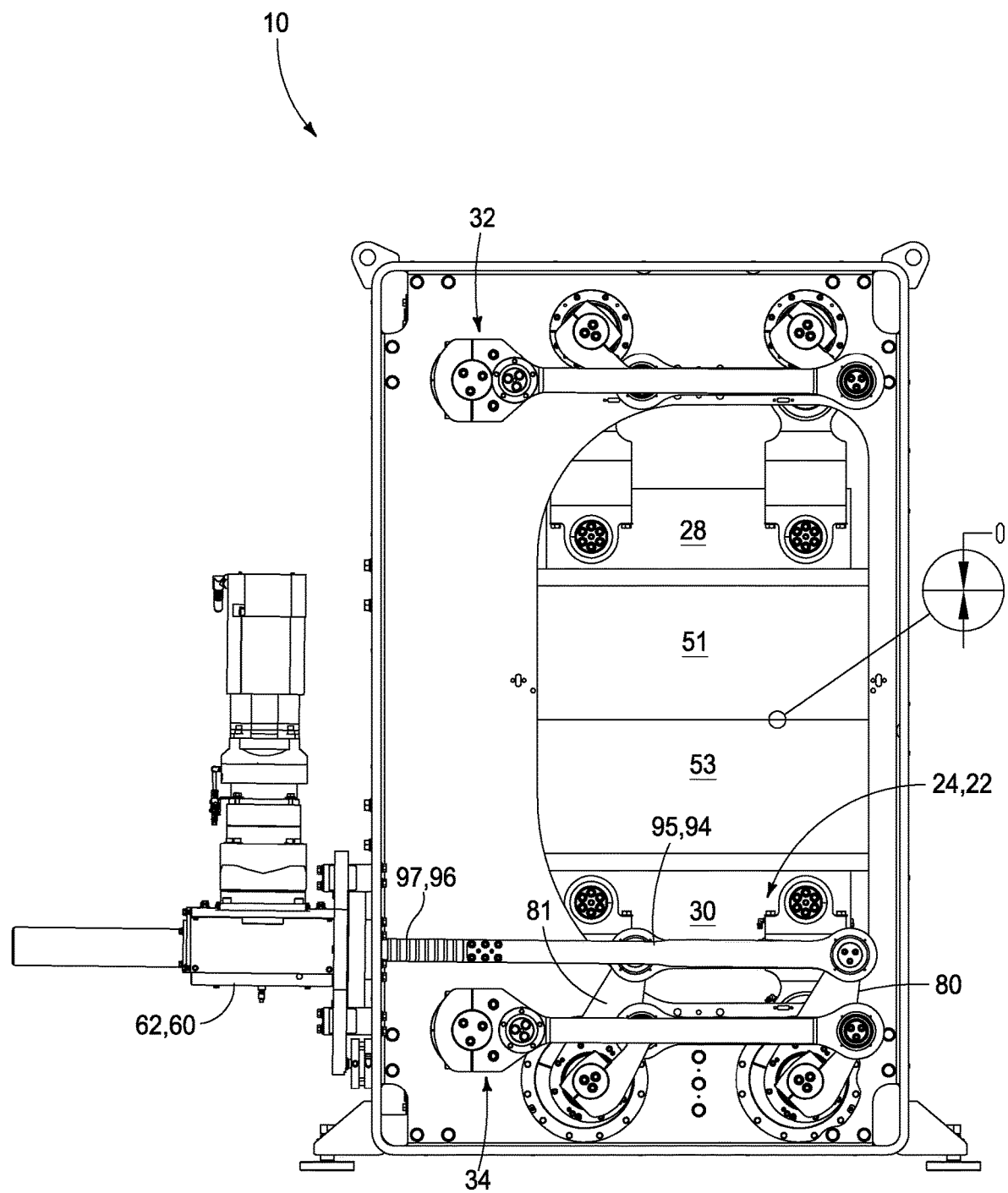
FIG. 24 is a left-side view of the thermoforming machine of FIG. 1 including the platen drive shaft, drive motors and drive linkages showing the platens in a fully closed position and the SASH in the shut height position without form air pressure.

FIG. 24 is a left-side view of the thermoforming machine 10 of FIG. 23 including the components of the platen drive assemblies 26 and 27 (see FIG. 1) showing the platens 51 and 53 in a fully closed position and SASH 12 in an initially loaded, or partially loaded position. In such position, upper platen drive assembly 32 and lower platen drive assembly 34 no longer have any gap between respective bottom and top die plate surfaces. No forming pressure has yet been applied between die plates 51 and 53 (from source 61 in FIG. 4).

Figure 25:
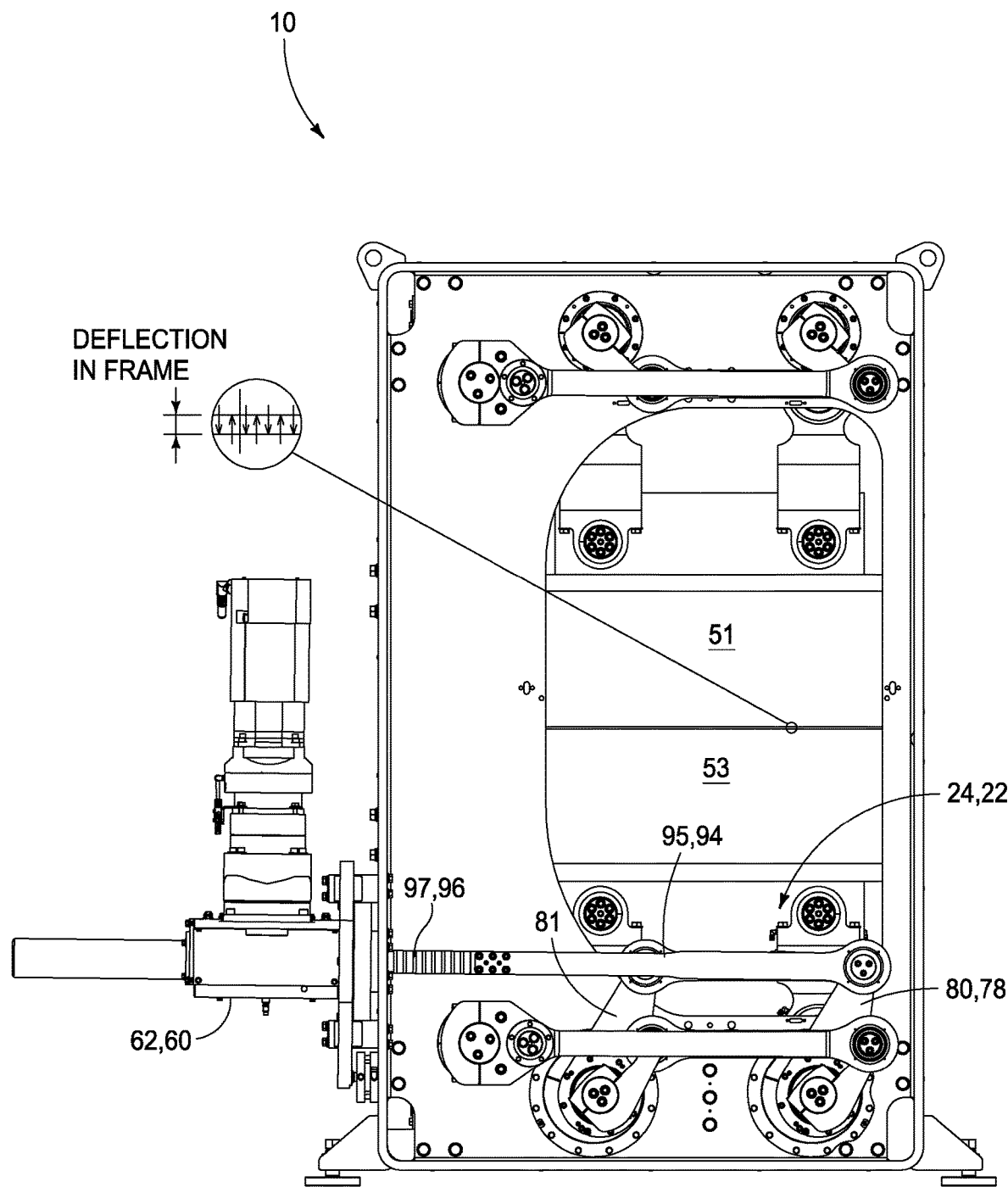
FIG. 25 is a left-side view of the thermoforming machine of FIG. 1 including the platen drive shaft, drive motors and drive linkages showing the platens in a fully closed position and the SASH in the shut height position with form air pressure.

FIG. 25 is a left-side view of the thermoforming machine 10 of FIGS. 23 and 24 including the components of the platen drive assemblies 26 and 27 (see FIG. 1) showing the platens 51 and 53 in a fully closed position and SASH 12 in a shut height position. Form air, or forming pressure has been applied from source 61 (see FIG. 4). One typical form air pressure can be 120 psi. In such position, upper platen drive assembly 32 and lower platen drive assembly 34 have a gap formed between respective bottom and top die plate surfaces resulting from deflection in the frame (and related drive linkages and members and platens).

Figure 26:
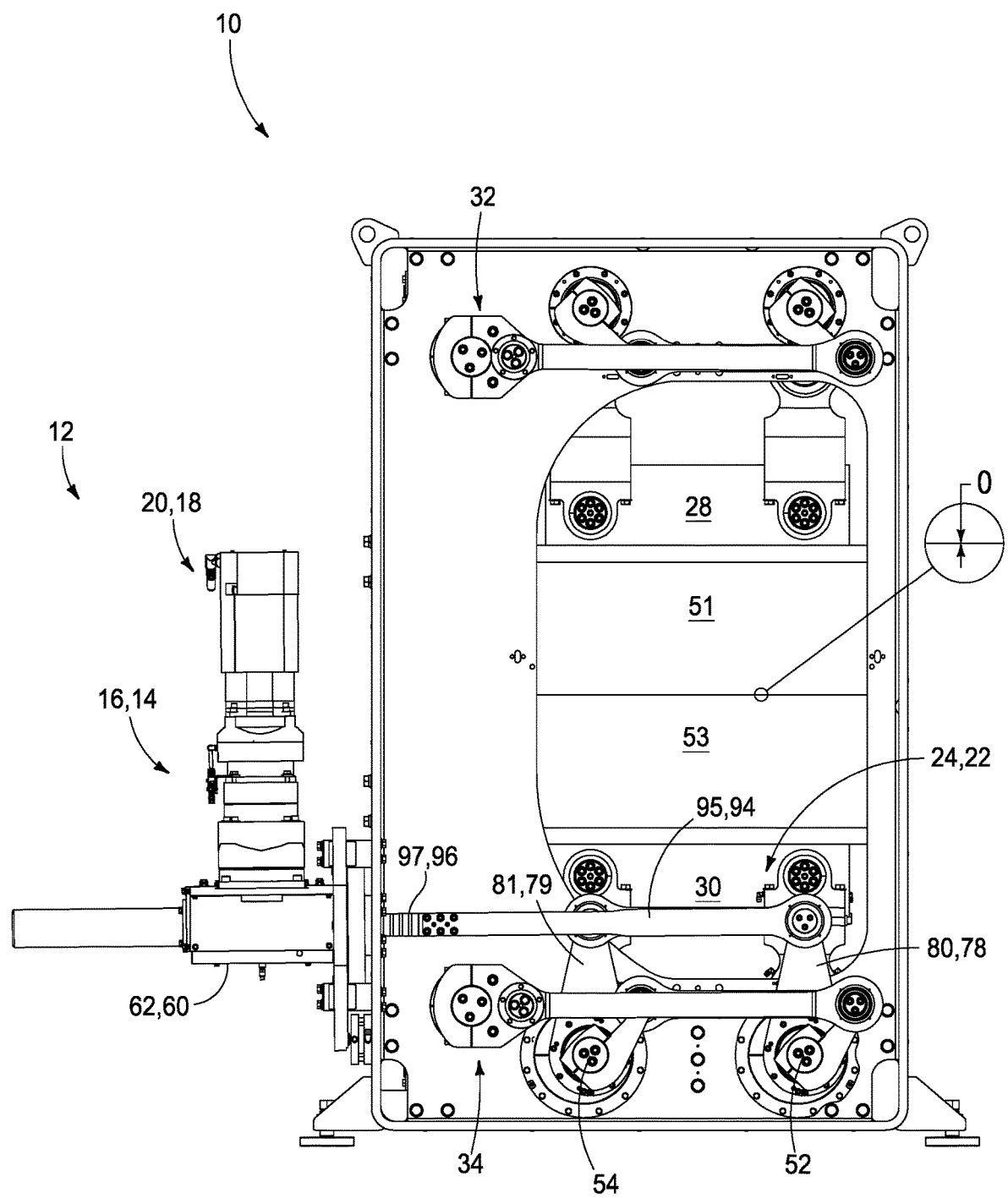
FIG. 26 is a left-side view of the thermoforming machine of FIG. 1 including the platen drive shaft, drive motors and drive linkages showing the platens in a fully closed position and the SASH in the shut height position with form air pressure with the SASH compensation height.

FIG. 26 is a left-side view of the thermoforming machine 10 of FIGS. 23-25 including the components of the platen drive assemblies 26 and 27 (see FIG. 1) showing the platens 51 and 53 in a fully closed position and SASH 12 in a fully loaded SASH compensation position sufficient to compensate for frame deformation. Form air, or forming pressure has been applied from source 61 (see FIG. 4). One typical form air pressure can be 120 psi. In such position, upper platen drive assembly 32 and lower platen drive assembly 34 would have a gap formed between respective bottom and top die plate surfaces resulting from deflection in the frame (and related drive linkages and members and platens (as shown in FIG. 25), but the fully loaded SASH compensation position of SASH 12 is sized in force by the control system to remove any gap from between die plates 51 and 53 resulting from forming pressure, or loads.

Figure 27:
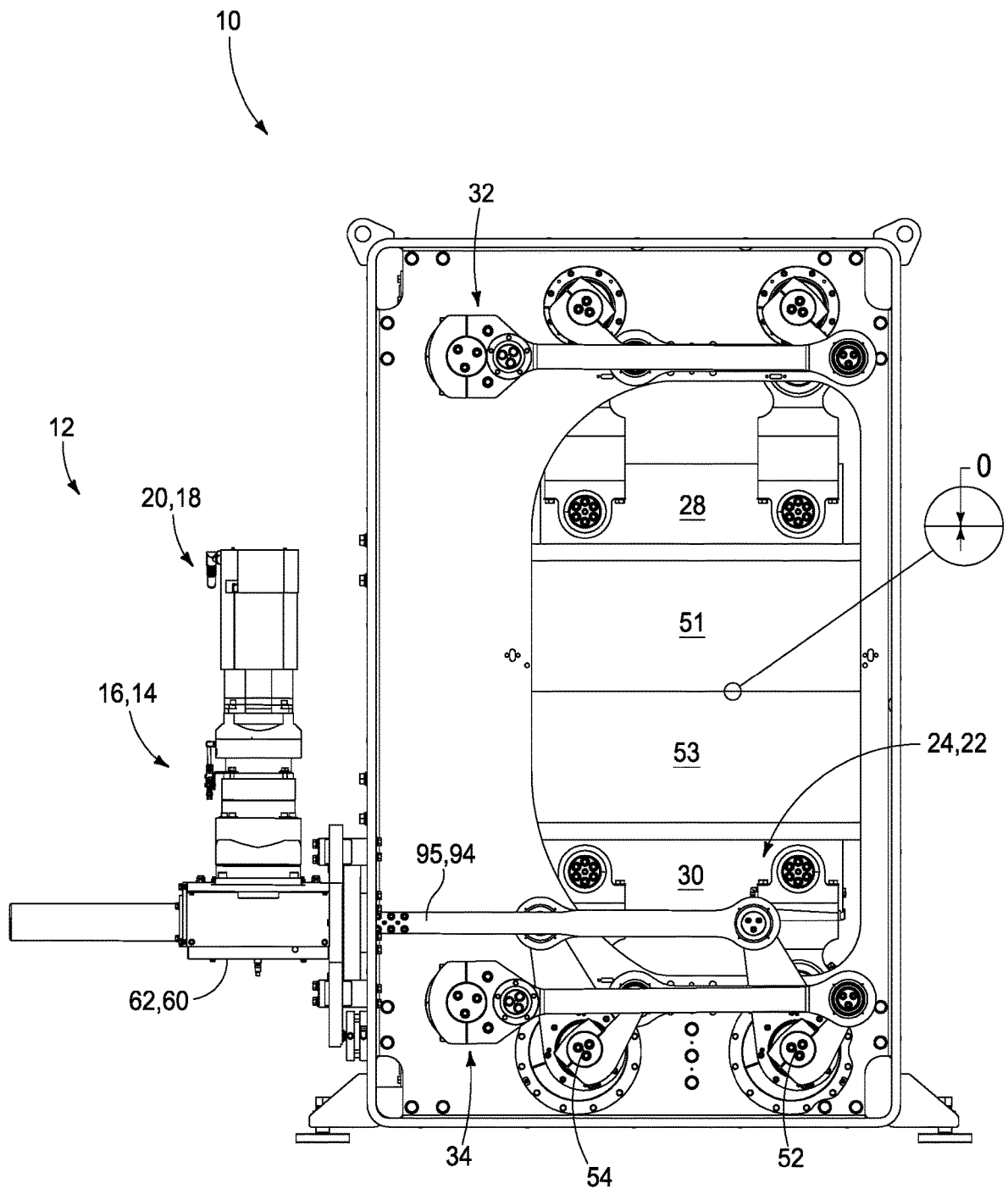
FIG. 27 is a left-side view of the thermoforming machine of FIG. 1 including the platen drive shaft, drive motors and drive linkages showing the platens in a fully closed position and the SASH in the shut height position with form air pressure with the SASH applied to coin articles.

FIG. 27 is a left-side view of the thermoforming machine of FIGS. 23-26 including the components of the platen drive assemblies 26 and 27 (see FIG. 1) showing the platens 51 and 53 in a fully closed position and SASH 12 in a coining position that creates even more force than the SASH compensation position of FIG. 26. Form air, or forming pressure has been applied from source 61 (see FIG. 4). One typical form air pressure can be 120 psi. In such position, upper platen drive assembly 32 and lower platen drive assembly 34 have no gap formed between respective bottom and top die plate surfaces because of the force applied by SASH 12. In fact, an even greater force is applied with SASH 12 in order to coin an outer edge of articles being formed between die plates 51 and 53.

Figure 28:
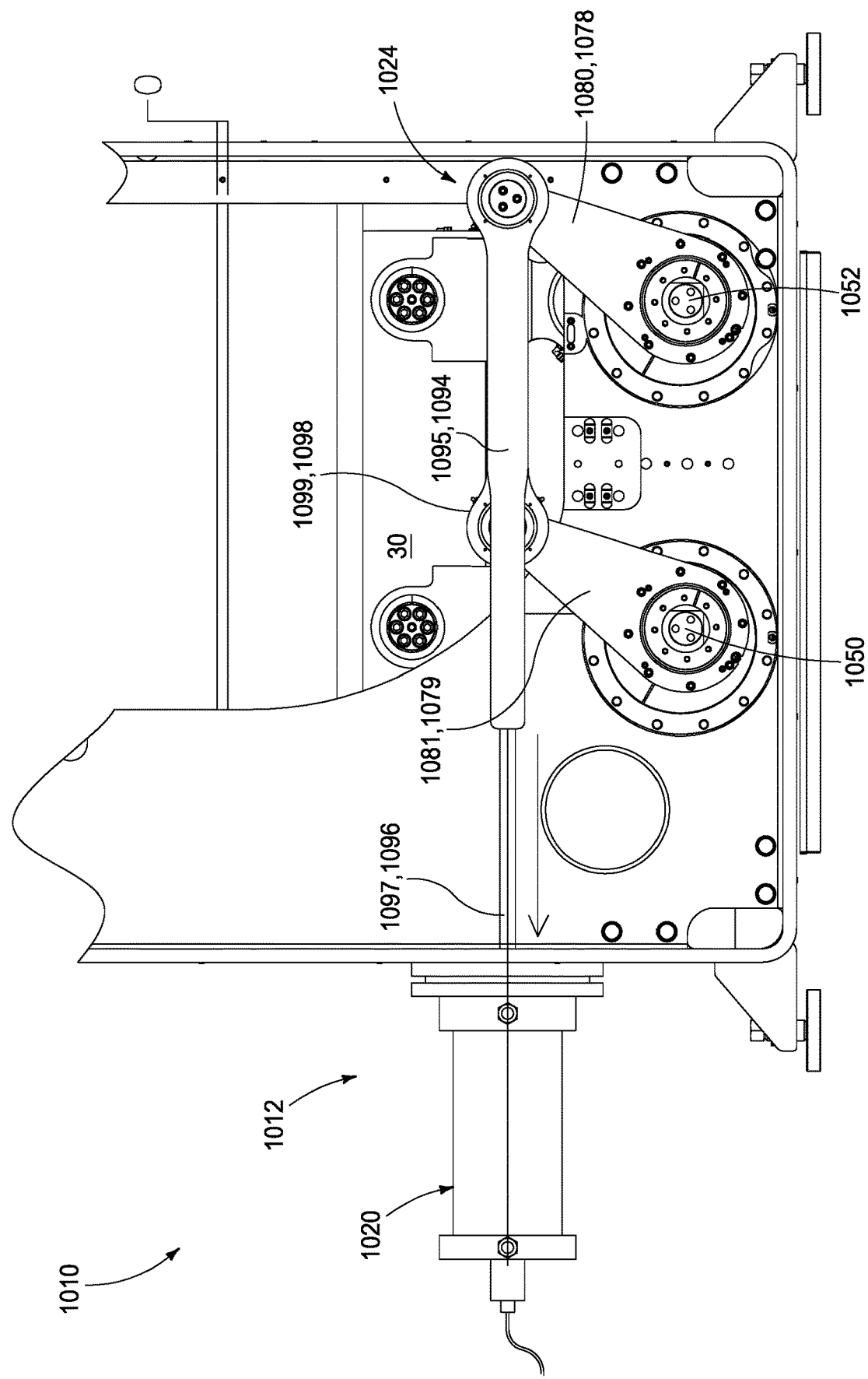
FIG. 28 is an alternative construction to the thermoforming machine of FIG. 1 shown as a left-side view including a hydraulic cylinder and crank drive linkages showing the platens in a fully closed position and SASH in a home, or open position.

FIG. 28 is an alternative construction thermoforming machine 1010 to the thermoforming machine 10 of FIG. 1 shown as a left-side partial view including an alternative construction SASH 1012 having a hydraulic cylinder 1020 and crank drive linkages 1078-1081 showing the platen 30 in a fully closed position and SASH 1012 in a home, or open position. SASH drive racks 1096 and 1097 and connecting links 1094 and 1095 are similar to those illustrated on thermoforming machine 10 (of FIG. 1), and remaining not shown components are the same as on machine 10 (of FIG. 1). Accordingly, drive linkage 1024 is essentially the same as drive linkage 24 (of FIG. 1). Finally, toggle drive shafts 1050 and 1052 are supported for eccentric movement in the same manner as toggle drive shafts 50 and 52 (in FIG. 1).

Figure 29:
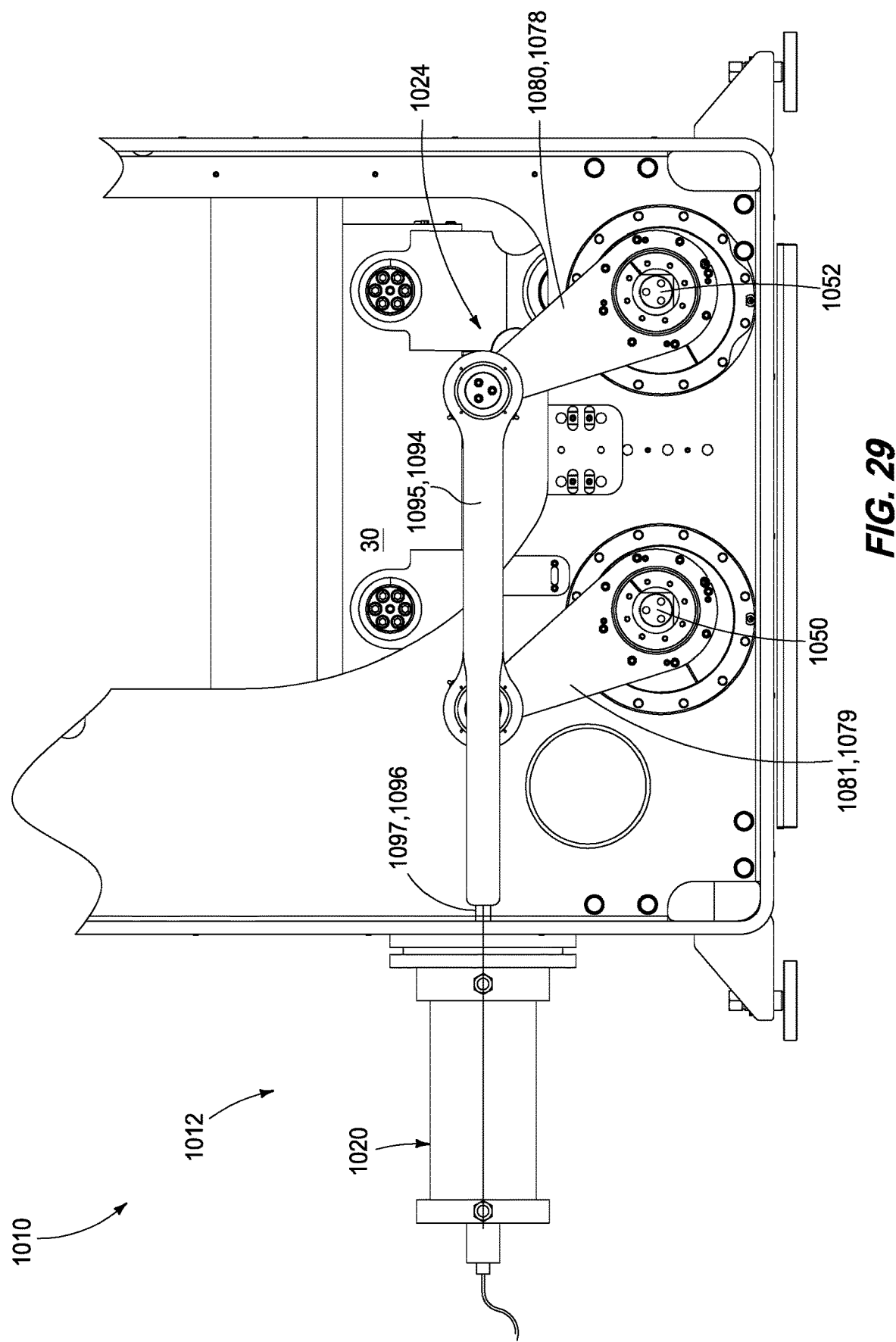
FIG. 29 is an alternative construction of FIG. 28 to the thermoforming machine of FIG. 1 shown as a left-side view including a hydraulic cylinder and crank drive linkages showing the platens in a fully closed position and SASH in a closed position.

FIG. 29 is a left-side partial view of the alternative construction thermoforming machine 1010 of FIG. 28 including a hydraulic cylinder 1020 and crank drive linkages 1078-1081 showing the platen 30 in a fully closed position and SASH 1012 in a closed position, further elevating by force platen 30.

Figure 30:
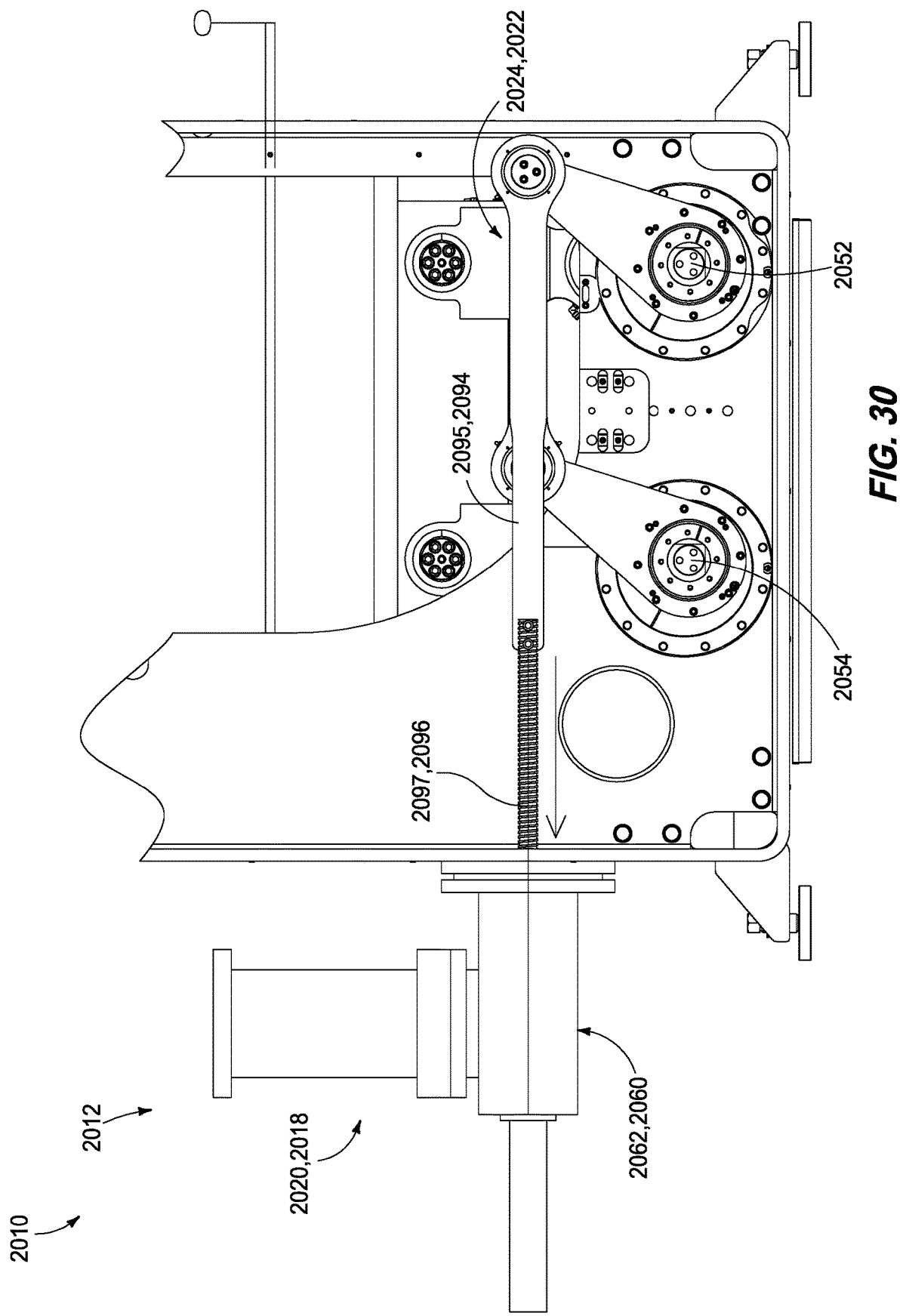
FIG. 30 is another alternative construction to the thermoforming machine of FIG. 1 shown as a left-side view including a ball screw, roller screw, and crank drive linkages showing the platens in a fully closed position and SASH in a home, or open position.

FIG. 30 is another alternative construction thermoforming machine 2010 to the thermoforming machine 10 of FIG. 1 shown as a left-side partial view including another alternative construction SASH 2012 including on each side a servo drive motor with an electric brake 2018 and 2020, a ball screw drive 2018 and 2020, a roller or ball screw 2096 and 209, a SASH drive link 2094 and 2095, and a crank drive linkage 2022 and 2024 showing the platen 30 in a fully closed position and SASH 2012 in a home, or open position. SASH drive racks 2096 and 2097 and connecting links 2094 and 2095 are similar to those illustrated on thermoforming machine 10 (of FIG. 1), and remaining not shown components are the same as on machine 10 (of FIG. 1). Accordingly, drive linkages 2022 and 2024 are essentially the same as drive linkages 22 and 24 (of FIG. 1). Finally, toggle drive shafts 2050 and 2052 are supported for eccentric movement in the same manner as toggle drive shafts 50 and 52 (in FIG. 1).

Figure 31:
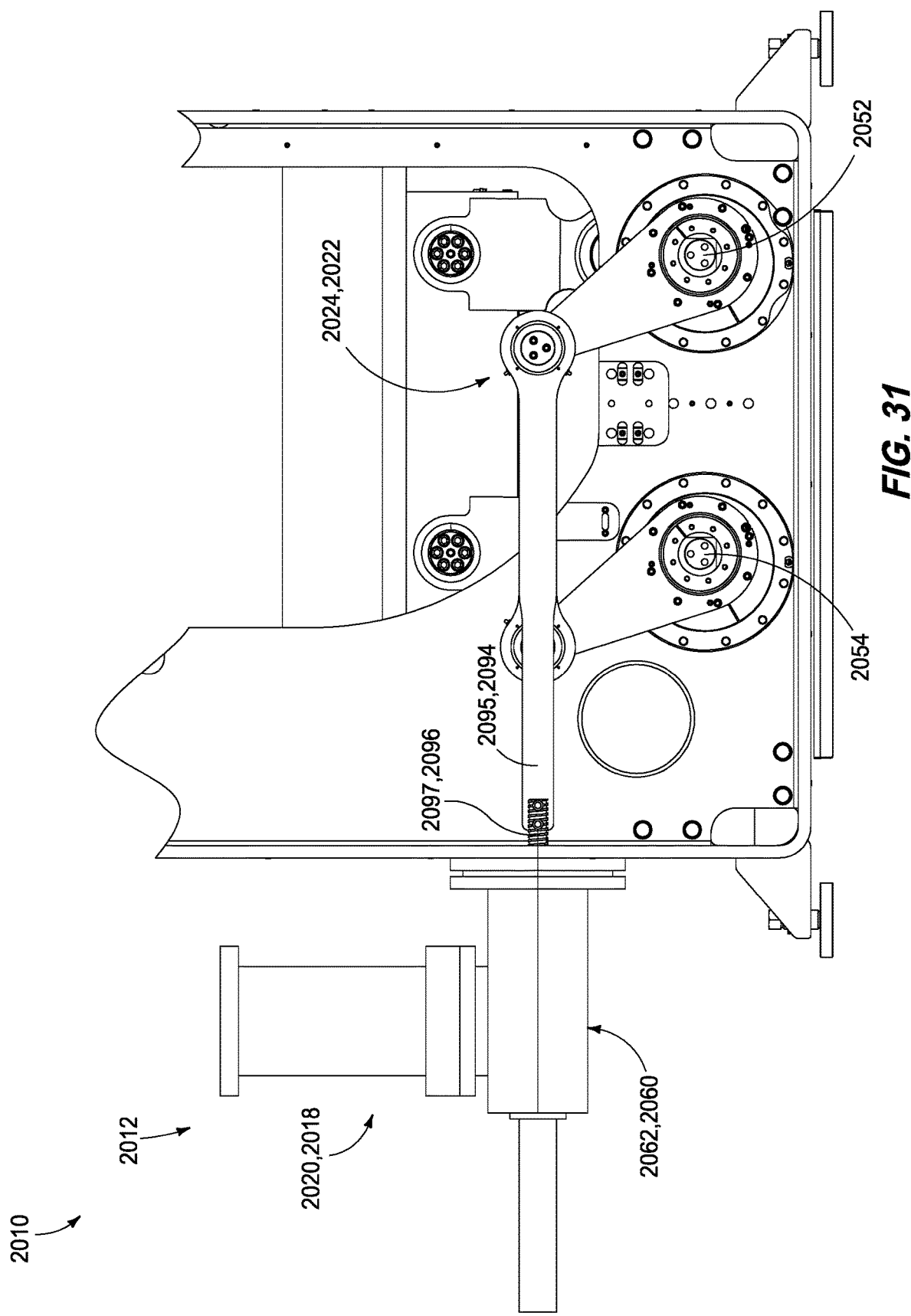
FIG. 31 is another alternative construction of FIG. 30 to the thermoforming machine of FIG. 1 shown as a left-side view including a balls screw, roller screw, and crank drive linkages showing the platens in a fully closed position and SASH in a closed position.

FIG. 31 is a left-side partial view of the alternative construction thermoforming machine 2010 of FIG. 30 including a hydraulic cylinder 2020 and crank drive linkages 2078-2081 showing the platen 30 in a fully closed position and SASH 2012 in a closed position, further elevating by force platen 30.

Figure 32:
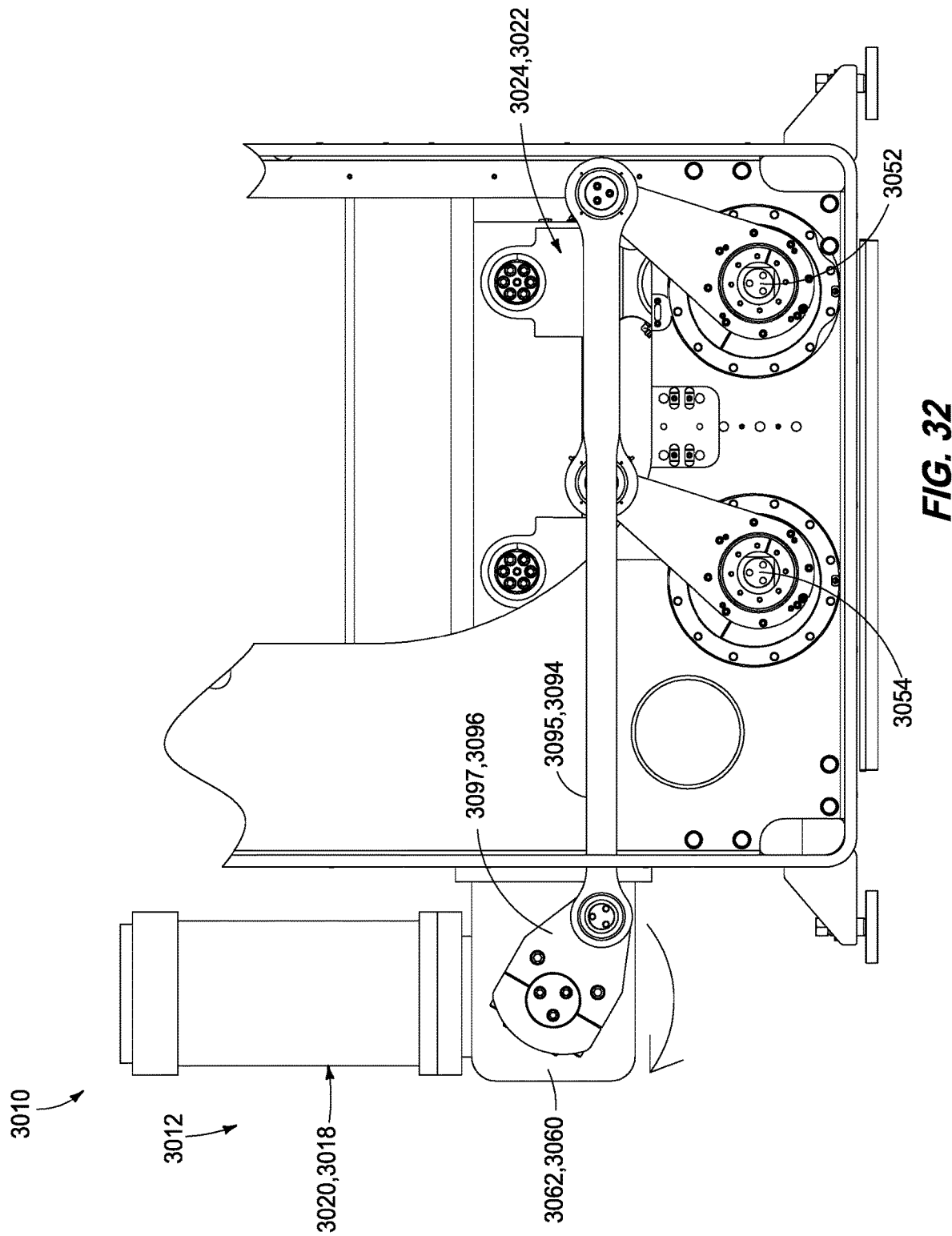
FIG. 32 is yet another alternative construction to the thermoforming machine of FIG. 1 shown as a left-side view including a gear box and crank drive linkages showing the platens in a fully closed position and SASH in a home, or open position.

FIG. 32 is yet another alternative construction thermoforming machine 3010 to the thermoforming machine 10 of FIG. 1 shown as a left-side partial view including another alternative construction SASH 3012 including on each side a servo drive motor with an electric brake 3018 and 3020, a gear box (bevel or worm) drive 3060 and 3062, a SASH drive link 3094 and 3095, and a crank drive linkage 3022 and 3024 showing the platen 30 in a fully closed position and SASH 2012 in a home, or open position. SASH crank arms 3096 and 3097 and drive links 3094 and 3095 serve similar functions to those parts illustrated on thermoforming machine 10 (of FIG. 1), and remaining not shown components are the same as on machine 10 (of FIG. 1). Accordingly, drive linkages 3022 and 3024 are essentially the same as drive linkages 22 and 24 (of FIG. 1). Finally, toggle drive shafts 3050 and 3052 are supported for eccentric movement in the same manner as toggle drive shafts 50 and 52 (in FIG. 1)

Figure 33:
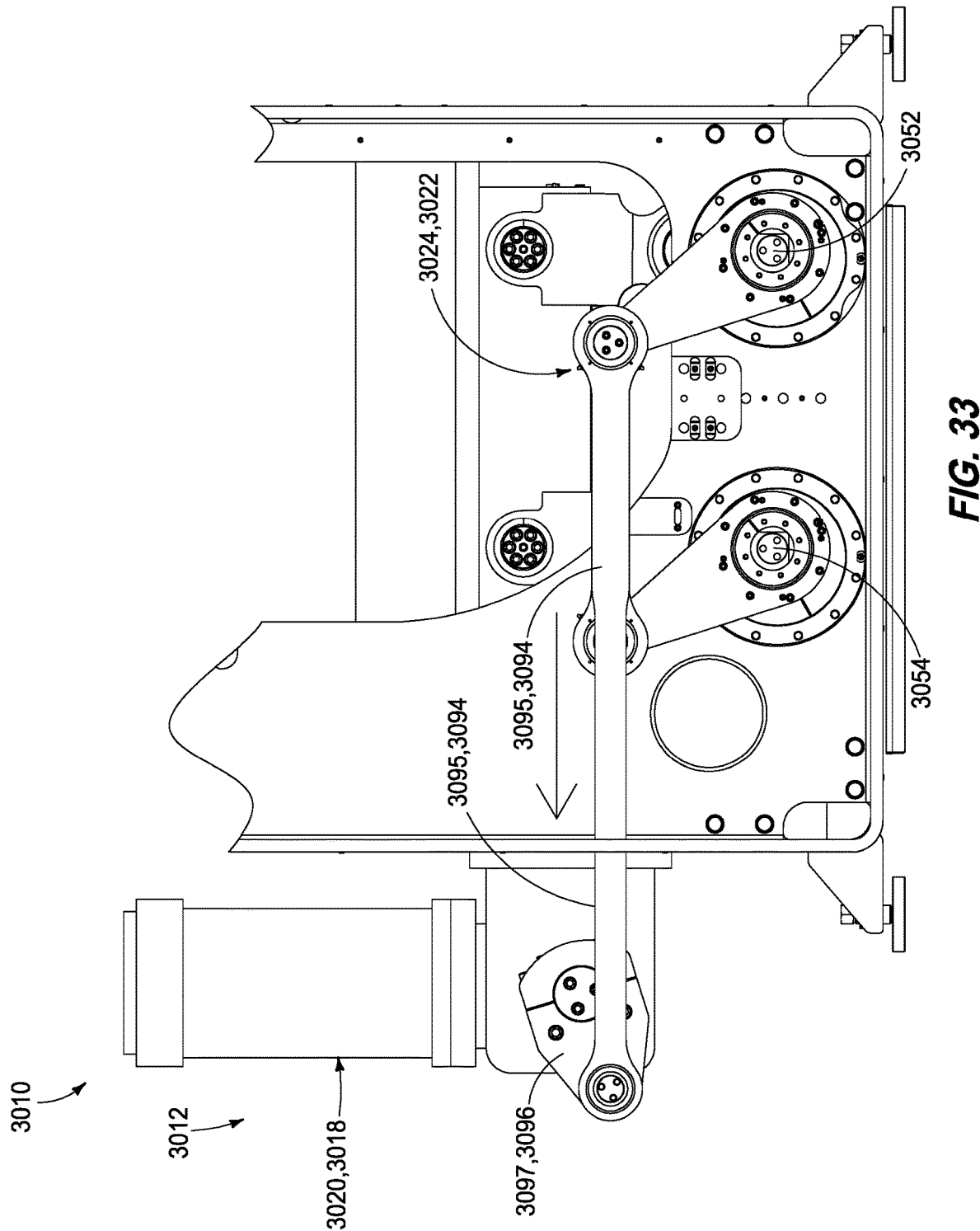
FIG. 33 is yet another alternative construction of FIG. 31 to the thermoforming machine of FIG. 1 shown as a left-side view including a gear box and crank drive linkages showing the platens in a fully closed position and SASH in a closed position.

FIG. 33 is yet another alternative construction of the alternative construction thermoforming machine 3010 of FIG. 32 including a SASH 3012 with drive motors and electric brakes 3018 and 3020, a gear box (bevel or worm) drive 3060 and 3062, crank arms 3096 and 3097, a SASH drive link 3094 and 3095, and a crank drive linkage 3022 and 3024 showing the platen 30 in a fully closed position and SASH 2012 in a closed position, further elevating by force platen 30.

Figure 34:
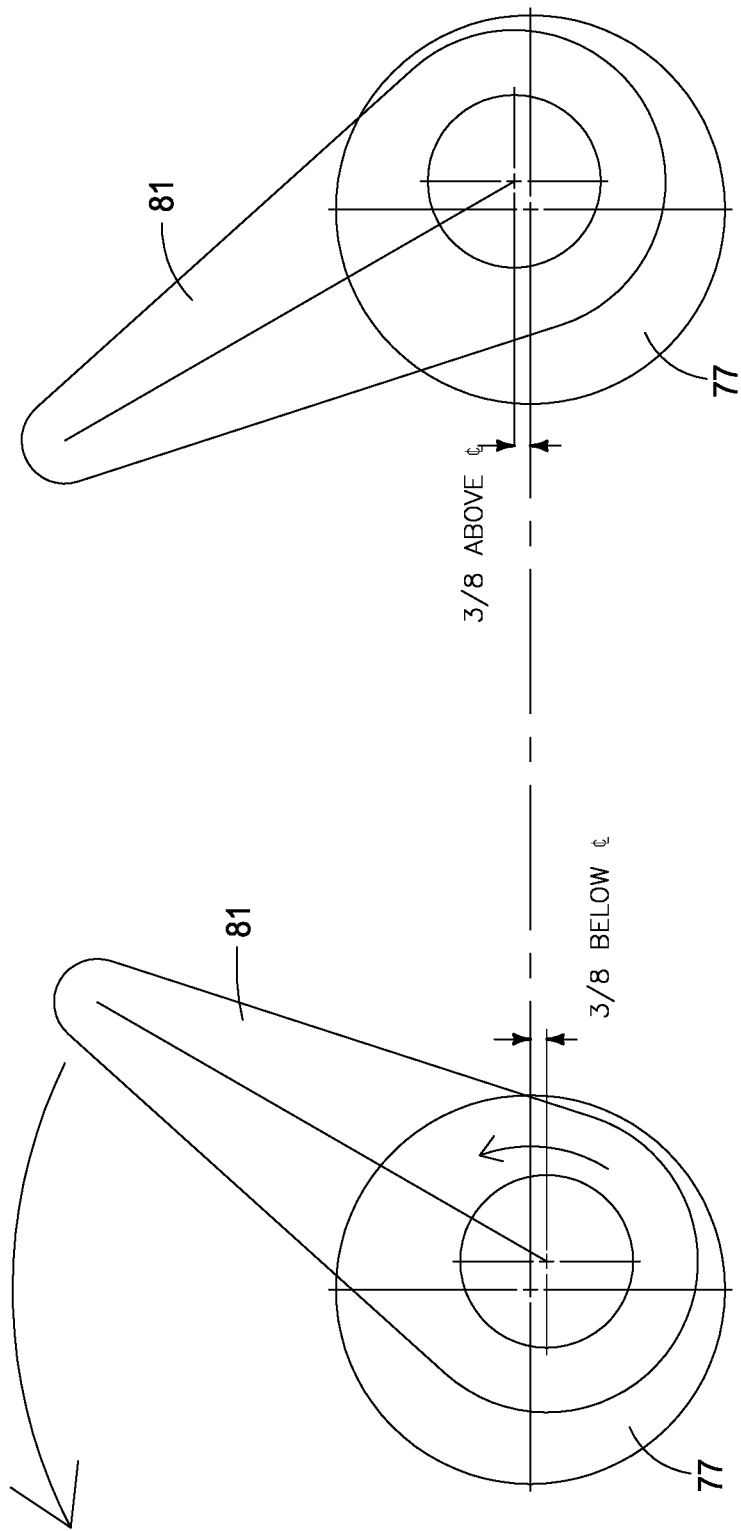
FIG. 34 is a simplified side view diagram showing an exemplary drive arm and eccentric bearing assembly of FIGS. 20-27.

FIG. 34 is a simplified side view diagram showing an exemplary drive arm 81 and eccentric bearing assembly represented by eccentric body 77 as used in the SASH of FIGS. 1-27. The simplified left diagram shows the arm 81 and body 77 in a lowered position, while the right diagram shows the arm 81 and body 77 in a raised position (elevating the respective toggle shaft).

Figure 35:
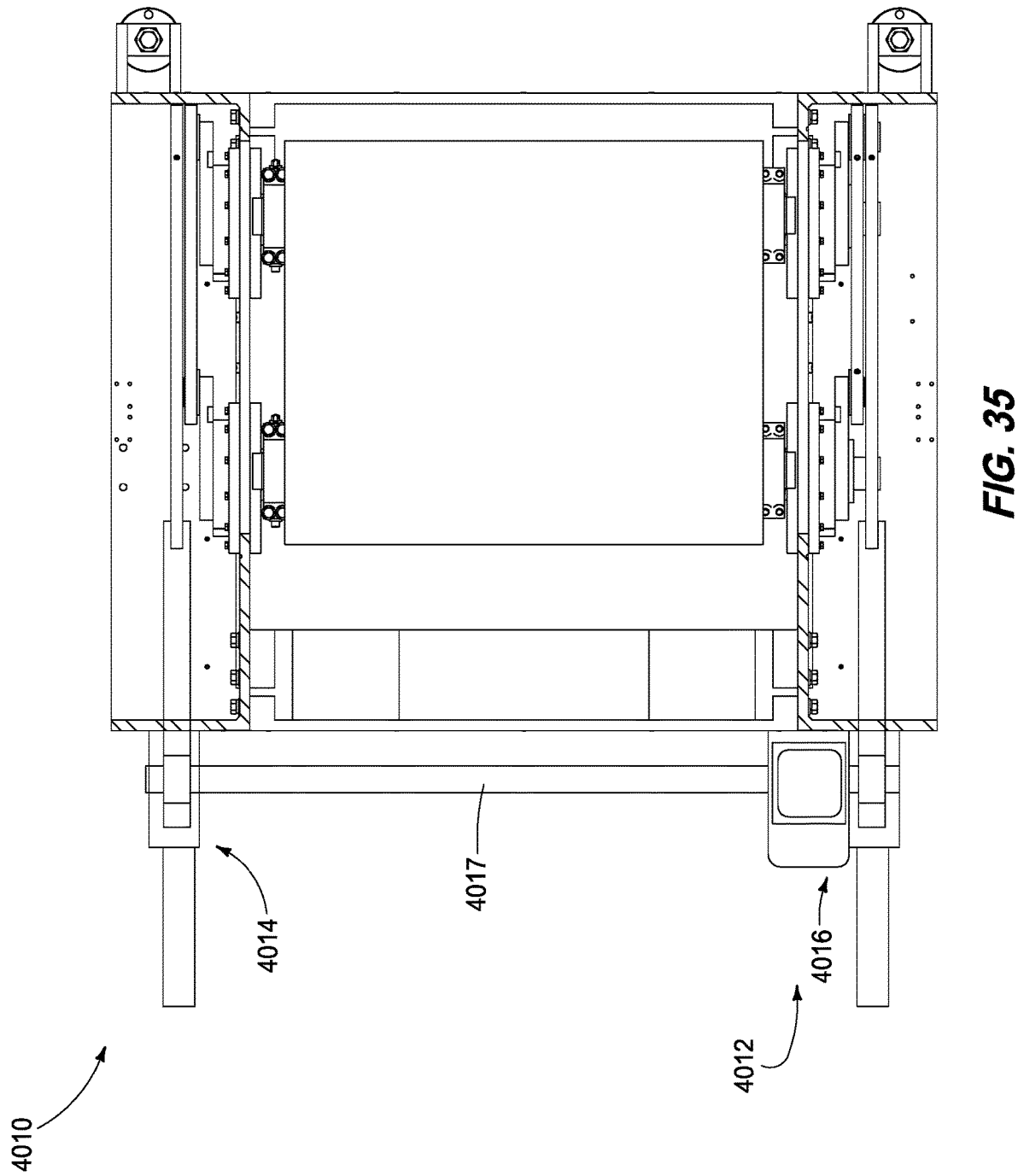
FIG. 35 is a simplified horizontal sectional top view of an alternative design thermoforming machine of FIG. 1 with a differential load source with a Servo Actuated Shut Height (SASH) using a single drive motor and gearbox with a common drive shaft for driving both pinion gears and racks.

FIG. 35 is a simplified horizontal sectional top view of an alternative design thermoforming machine 4010 similar to thermoforming machine 10 of FIG. 1 with a differential load source having a Servo Actuated Shut Height (SASH) 4012 using a single drive motor and gearbox assembly 4016 with a common drive shaft 4017 configured to drive both pinion gears and racks on each side of thermoforming machine 4010, such as pinion gear and rack 4014, as well as an integrated pinion drive on assembly 4016 that drives a drive link.

Figure 36:
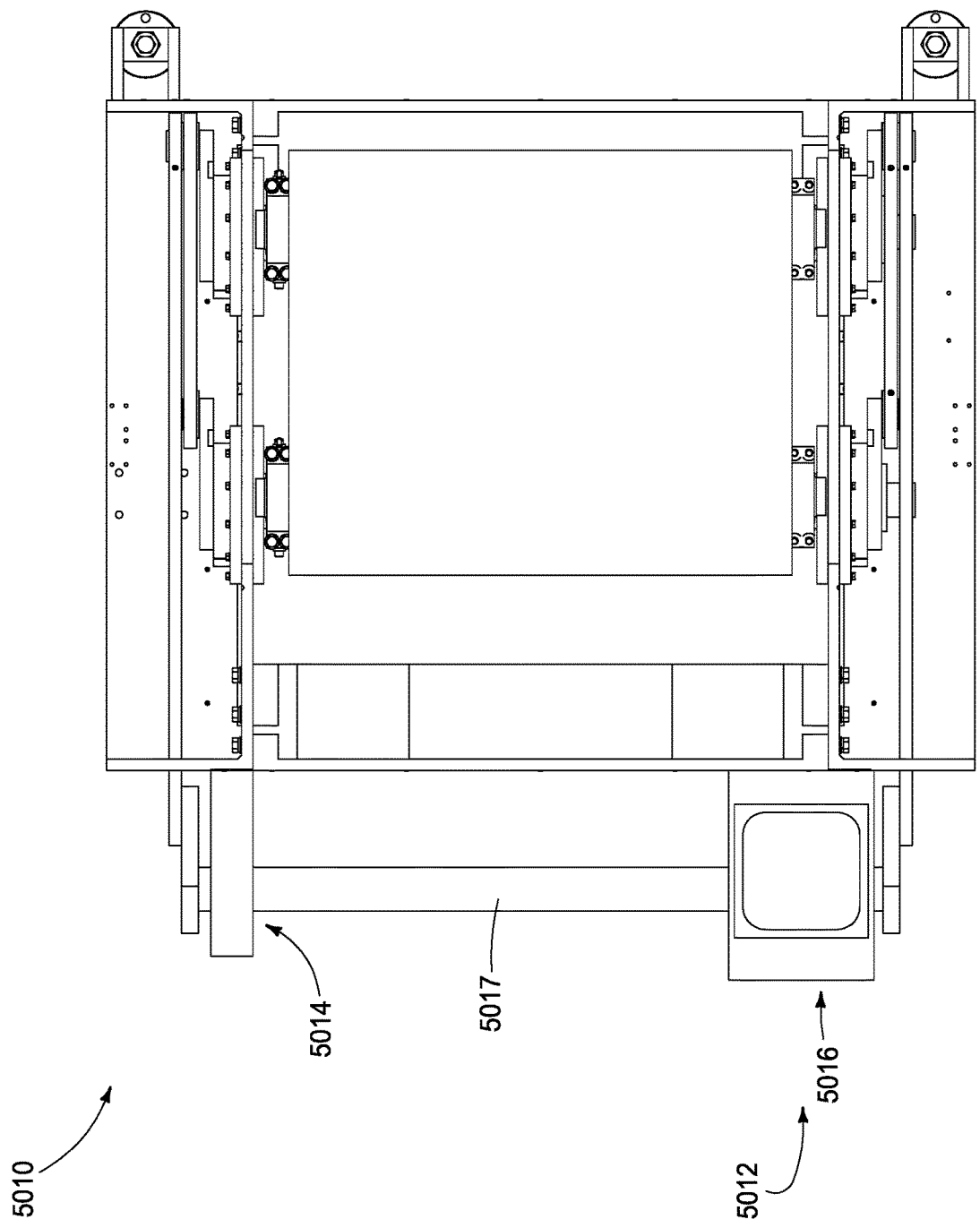
FIG. 36 is a simplified horizontal sectional top view of another alternative design thermoforming machine of FIG. 1 with a differential load source with a Servo Actuated Shut Height (SASH) using a single drive motor and gearbox with a common drive shaft for driving two sets of cranks and SASH pull arms.

FIG. 36 is a simplified horizontal sectional top view of another alternative design thermoforming machine 5010 similar to thermoforming machine 10 of FIG. 1 with a differential load source having a Servo Actuated Shut Height (SASH) 5012 using a single drive motor and gearbox assembly 5016 with a common drive shaft 5017 configured to drive two sets of cranks and SASH drive links on each side of thermoforming machine 5010, such as pinion gear and rack 5014, as well as an integrated pinion drive on assembly 5016 that drives a drive link.

While the subject matter of this application was motivated in addressing flatness and sealing between die plates when forming using high forming loads, such as loads generated when using forming pressure, or air to help form articles during a thermoforming operation, it is in no way so limited. The disclosure is only limited by the accompanying claims as literally worded, without interpretative or other limiting reference to the specification, and in accordance with the doctrine of equivalents.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. A thermoforming apparatus, comprising:
    a frame having an array of laterally spaced apart frame corner beams of substantially uniform length configured to carry tensile loads during a forming operation;
    a pair of opposed platens carried by the frame contained within the array of frame corner beams each with an article forming member, one article forming member configured to engage an opposed face of another article forming member across a heated sheet of thermoformable material in a sealed forming position;
    a platen closing mechanism having symmetric and opposed closing arms contained laterally inboard of the array of frame corner beams and spaced laterally outboard of the pair of opposed platens and configured to cyclically separate and engage together the platens and maintain parallel closed engagement between the platens when closed in the sealed forming position;
    a pneumatic form air source having a force actuator interposed between the frame and one of the dies, contained laterally inboard of the array of frame corner beams and configured to impart differential pressure across the heated web within a sealed region between the article forming members when the article forming members are closed together about the sheet to urge the heated sheet into one of the article forming members or another of the article forming members; and
    a seal maintaining mechanism having a force actuator provided between the one article forming member and the frame outboard of one of the platens carrying the one article forming member, contained laterally inboard of the array of frame corner beams and configured to impart a closing force to the one article forming member towards the another article forming member proportioned to at least counteract the differential pressure from the pneumatic form air source and maintain the sealed forming position during structural deformation of at least the frame caused by differential pressure between the one article forming member and the another article forming member during a forming operation.

2. The thermoforming machine of claim 1, wherein the seal maintaining mechanism comprises an articulating connection between one platen and the frame configured to move the one platen and the one article forming member towards the another platen and the another article forming member.

3. The thermoforming machine of claim 2, wherein the seal maintaining mechanism further comprises an articulating toggle shaft coupled with the one platen configured to reciprocate the one platen towards and away from the another platen.

4. The thermoforming machine of claim 3, wherein the articulating toggle shaft comprises an eccentric bearing assembly provided at each end of the toggle shaft in the frame and outboard of the one platen and having a toggle bearing for supporting the toggle shaft for rotation and a drive link affixed to each of the eccentric bearings to rotate the toggle bearings and the toggle shaft between raised and lowered positions to raise and lower the one platen.

5. The thermoforming machine of claim 4, wherein the one platen is coupled to the toggle shaft with a kinematic drive linkage.

6. The thermoforming machine of claim 1, further comprising a kinematic drive linkage provided between one of the platens and the frame.

7. The thermoforming machine of claim 1, wherein the pneumatic form air source is a source of pressurized air fluidly coupled with a chamber between the one of the article forming members and the heated sheet, wherein a seal is provided between a top surface of the bottom article forming member, and the pressurized air is introduced beneath the heated sheet, the seal, and the top surface of the bottom article forming member.

8. The thermoforming machine of claim 7, wherein the pneumatic form air source is a source of vacuum applied between one of the article forming members comprising a female mold member and the sheet.

9. A thermoforming apparatus, comprising:
a frame having an array of laterally spaced apart frame corner beams of substantially uniform length configured to carry tensile loads during a forming operation;
a pair of opposed platens carried by the frame contained within the array of frame corner beams each with an article forming member, one article forming member configured to engage an opposed face of another article forming member across a heated sheet of thermoformable material;
a seal provided by one of the dies configured to seal the sheet with the one article forming member when engaged with the another article forming member;
a toggle shaft carried by the frame for rotation outboard of the platens and the article forming members;
a kinematic linkage coupled between the toggle shaft and one of the dies to provide a platen closing mechanism that engages the article forming members and the seal with the sheet in a sealed forming position, the platen closing mechanism having symmetric and opposed closing arms spaced laterally outboard of the pair of opposed platens, contained laterally inboard of the array of frame corner beams and configured to cyclically separate and engage together the platens and maintain parallel closed engagement between the platens when closed in the sealed forming position;
a form air manifold and a source of differential pressure having a force actuator coupled with a face on one of the article forming members, contained laterally inboard of the array of frame corner beams configured to generate forming pressure; and
a seal maintaining mechanism including a pair of articulating bearing assemblies carried by the frame outboard of the platens having drive arms contained laterally inboard of the array of frame corner beams and configured to support the at least one toggle shaft for translation towards and away from the another article forming member and platen configured to maintain the sealed forming position under the forming pressure.

10. The thermoforming apparatus of claim 9, wherein the articulating bearing assembly comprises an eccentric bearing assembly having an eccentric carrier body, an outer bearing received between the frame and the eccentric body, and an inner bearing configured to be received in a bore within the eccentric body configured to carry one end of the toggle shaft offset from a central axis of the outer bearing.

11. The thermoforming apparatus of claim 10, wherein the articulating bearing assembly comprises a radially extending drive arm coupled with the eccentric body to rotate the inner bearing eccentrically within the outer bearing to raise and lower the one end of the toggle shaft.

12. The thermoforming apparatus of claim 11, wherein an articulating bearing assembly is provided at each end of the toggle shaft.

13. A thermoforming apparatus, comprising:
a frame having an array of laterally spaced apart frame corner beams of substantially uniform length configured to carry tensile loads during a forming operation;
a pair of opposed platens and article forming members carried by the frame contained within the array of frame corner beams to engage oppositely across a heated sheet of thermoformable material;
a seal provided by one of the article forming members configured to seal the sheet with the one article forming member when engaged with the another article forming member;
a pneumatic form air source configured between the heated sheet and one of the article forming members to generate a forming pressure; and
a two-stage force applicator comprising: (a) a platen closing mechanism having closing arms contained laterally inboard of the array of frame corner beams configured to reciprocate at least one of the platens together and apart relative to another of the platens to a sealed forming position, and (b) a seal maintaining mechanism having a force actuator provided between one of the article forming members and the frame outboard of one of the platens contained laterally inboard of the array of frame corner beams carrying the one article forming member and configured to generate a force that maintains the sealed forming position under the forming pressure, the platen closing mechanism having symmetric and opposed closing arms spaced laterally outboard of the pair of opposed platens and configured to cyclically separate and engage together the platens and maintain parallel closed engagement between the platens when closed in the sealed forming position.

14. The thermoforming apparatus of claim 13, wherein the platen closing mechanism and the seal maintaining mechanism are concurrently actuated.

15. The thermoforming apparatus of claim 13, wherein the platen closing mechanism comprises a pair of platen drive assemblies.

16. The thermoforming apparatus of claim 13, wherein the seal maintaining mechanism comprises an articulating bearing assembly having an eccentric bearing assembly with an eccentric carrier body, an outer bearing received between the frame and the eccentric body, and an inner bearing configured to be received in a bore within the eccentric body configured to carry one end of the toggle shaft offset from a central axis of the outer bearing.

17. The thermoforming apparatus of claim 13, wherein the pair of article forming members a male mold member and a female mold member.

18. The thermoforming apparatus of claim 17, wherein the male mold member and the female mold member are provided as individual mating mold sets.

19. The thermoforming apparatus of claim 18, where each mold set comprises a die plate.

* * * * *